(12) United States Patent
Wang et al.

(10) Patent No.: US 12,020,158 B2
(45) Date of Patent: Jun. 25, 2024

(54) DEEP NEURAL NETWORK PROCESSING FOR A USER EQUIPMENT-COORDINATION SET

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/306,010

(22) Filed: Apr. 24, 2023

(65) Prior Publication Data

US 2023/0259772 A1 Aug. 17, 2023

Related U.S. Application Data

(62) Division of application No. 16/915,909, filed on Jun. 29, 2020, now Pat. No. 11,663,472.

(51) Int. Cl.
*G06N 3/08* (2023.01)
*G06N 3/04* (2023.01)
*H04B 7/026* (2017.01)

(52) U.S. Cl.
CPC ............... *G06N 3/08* (2013.01); *G06N 3/04* (2013.01); *H04B 7/026* (2013.01)

(58) Field of Classification Search
CPC ............ G06N 3/08; G06N 3/04; G06N 3/044; G06N 3/045; H04B 7/026; H04B 7/024; H04W 84/18; H04W 24/02
See application file for complete search history.

(56) References Cited

U.S. PATENT DOCUMENTS

| | | | | |
|---|---|---|---|---|
| 11,546,040 B2* | 1/2023 | Nayak | .................. | H04B 17/309 |
| 2020/0366326 A1* | 11/2020 | Jassal | ...................... | H04L 41/16 |
| 2020/0382929 A1* | 12/2020 | Shi | ......................... | G06N 3/063 |
| 2021/0160149 A1* | 5/2021 | Ma | ........................ | H04W 76/10 |

FOREIGN PATENT DOCUMENTS

WO WO-2021249637 A1 * 12/2021 ............. G06N 20/00

* cited by examiner

*Primary Examiner* — Xin Jia
(74) *Attorney, Agent, or Firm* — Womble Bond Dickinson (US), LLP

(57) ABSTRACT

Techniques and apparatuses are described for deep neural network (DNN) processing for a user equipment-coordination set (UECS). A network entity selects (910) an end-to-end (E2E) machine-learning (ML) configuration that forms an E2E DNN for processing UECS communications. The network entity directs (915) each device of multiple devices participating in an UECS to form, using at least a portion of the E2E ML configuration, a respective sub-DNN of the E2E DNN that transfers the UECS communications through the E2E communication, where the multiple devices include at least one base station, a coordinating user equipment (UE), and at least one additional UE. The network entity receives (940) feedback associated with the UECS communications and identifies (945) an adjustment to the E2E ML configuration. The network entity then directs at least some of the multiple devices participating in an UECS to update the respective sub-DNN of the E2E DNN based on the adjustment.

11 Claims, 12 Drawing Sheets

DEEP NEURAL NETWORK PROCESSING FOR A USER EQUIPMENT-COORDINATION SET

CROSS-REFERENCE TO RELATED APPLICATIONS

This patent application is a continuation of U.S. patent application Ser. No. 16/915,909 filed Jun. 29, 2020, entitled "Deep Neural Network Processing For A User Equipment-Coordination Set," the disclosures of which are incorporated by reference herein in their entireties.

BACKGROUND

In a wireless network, a base station provides a user equipment (UE) with connectivity to various services, such as data and/or voice services, over a cell coverage area. The base station typically determines configurations for a wireless connection used by the UE to access the services. For example, the base station determines bandwidth and timing configurations of the wireless connection.

The quality of the wireless connection between the base station and the UE often varies based on a number of factors, such as signal strength, bandwidth limitations, interfering signals, and so forth. A first UE operating at an edge of a cell coverage area, for example, typically receives a weaker signal from the base station relative to a second UE operating relatively close to the center of the cell coverage area. Thus, as the UE moves to different regions of the cell coverage area, the quality of service sometimes degrades. With recent advancements in wireless communication systems, such as Fifth Generation New Radio (5G NR), new approaches may be available to improve the quality of service.

SUMMARY

This document describes techniques and apparatuses for deep neural network (DNN) processing for a user equipment-coordination set (UECS). In aspects, a network entity selects an end-to-end (E2E) machine-learning (ML) configuration that forms an E2E DNN for processing UECS communications. The network entity directs each device of multiple devices participating in an UECS to form, using at least a portion of the E2E ML configuration, a respective sub-DNN of the E2E DNN that transfers the UECS communications through the E2E communication, where the multiple devices include at least one base station, a coordinating user equipment (UE), and at least one additional UE. The network entity receives feedback associated with the UECS communications and identifies an adjustment to the E2E ML configuration. The network entity then directs at least some of the multiple devices participating in an UECS to update the respective sub-DNN of the E2E DNN based on the adjustment.

In aspects, a coordinating user equipment (UE) confirms, with a network entity, a training schedule that indicates a time period to maintain one or more fixed machine-learning (ML) architectures of a second portion of an end-to-end (E2E) ML configuration that forms a second set of sub-deep neural networks (sub-DNNs), of an E2E DNN, that transfer wireless-network-based user equipment-coordination set (UECS) communications through an E2E communication. The coordinating UE determines, based on the training schedule, an adjustment to the first portion of the E2E ML configuration that forms the first set of sub-DNNs that transfer the local-wireless-network-based UECS communications through the E2E communication. In response to determining the adjustment, the coordinating UE directs one or more additional UEs participating in the UECS to update one or more sub-DNNs of the first set of sub-DNNs using the adjustment to the first portion of the E2E ML configuration.

The details of one or more implementations of DNN processing for a UECS are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of deep neural network (DNN) processing for a user equipment-coordination set (UECS) are described below. The use of the same reference numbers in different instances in the description and the figures indicate similar elements.

DETAILED DESCRIPTION

Figure 1:
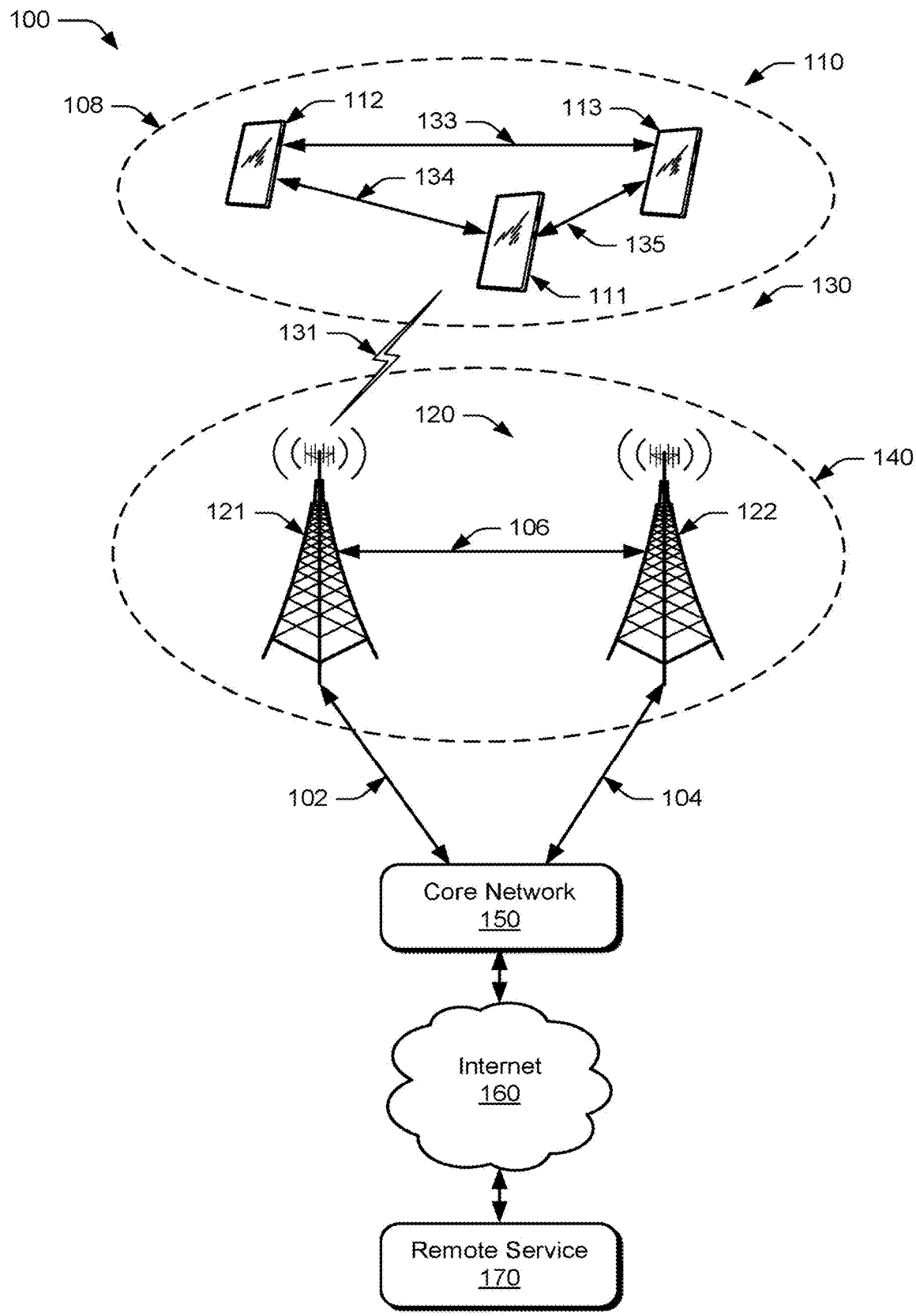
FIG. 1 illustrates an example environment in which various aspects of DNN processing for a UECS can be implemented.

In previous wireless communication systems, various factors affect a quality of services provided by a base station to a user equipment (UE), such as a location of the UE affecting signal strength. To improve the quality of service, various aspects configure and/or establish a user equipment-coordination set (UECS) to perform joint processing (e.g., joint transmission, joint reception) of communications for a target UE.

Generally, a UECS includes at least two UEs that communicate through a local wireless network connection, such as to share or distribute signal-related information for downlink and/or uplink UECS communications. By having multiple UEs form a UECS for joint transmission and reception of data intended for a target UE within the UECS, the UEs in the UECS coordinate in a manner similar to a distributed antenna for the target UE to improve the effective signal quality between the target UE and the base station. Downlink data intended for the target UE can be transmitted to the multiple UEs in the UECS. Each of the UEs demodulates and samples the downlink data and then forwards the samples to a single UE in the UECS, such as a coordinating UE or the target UE, for joint processing. In addition, uplink data generated by the target UE can be distributed to the multiple UEs in the UECS for joint transmission to the base station. Coordinating joint transmission and reception of data intended for the target UE significantly increases the target UE's effective transmission power by using multiple UEs to transmit the uplink data, thus improving the effective signal quality.

Deep neural networks (DNNs) provide solutions for performing various types of operations, such as operations that transfer UECS communications through an end-to-end (E2E) communication. To illustrate, some aspects of DNN processing for a UECS train a DNN how to jointly process (e.g., joint reception, joint transmission) UECS communications transferred through an E2E communication between one or more base stations and multiple UEs included in a UECS. As one example, an end-to-end (E2E) DNN learns to (a) process communications transferred over a first wireless network between a base station and the UEs included in the UECS, and (b) process communications transferred over a second, local wireless network between the UEs.

A network entity, such as a base station and/or core network server, determines an end-to-end machine-learning configuration (E2E ML configuration) that forms an E2E DNN trained to process UECS communications, and directs various devices to form sub-DNNs using portions of the E2E ML configuration. In some cases, the network entity dynamically reconfigures the E2E DNN based on various factors, such as a change in signal and/or link quality, a change in participating devices in the UECS, or a change in a coordinating UE within the UECS. The ability to dynamically adapt the E2E DNNs provides a flexible solution to responding to these changing factors and improve an overall performance (e.g., higher processing resolution, faster processing, lower bit errors, improved signal quality, reduced latency) of data transfer and/or recovery through an E2E communication.

This document describes aspects of DNN processing for a UECS. In aspects, a network entity selects an end-to-end (E2E) machine-learning (ML) configuration that forms an E2E DNN for processing UECS communications. The network entity directs each device of multiple devices participating in an UECS to form, using at least a portion of the E2E ML configuration, a respective sub-DNN of the E2E DNN that transfers the UECS communications through the E2E communication, where the multiple devices include at least one base station, a coordinating user equipment (UE), and at least one additional UE. The network entity receives feedback associated with the UECS communications and identifies an adjustment to the E2E ML configuration. The network entity then directs at least some of the multiple devices participating in an UECS to update the respective sub-DNN of the E2E DNN based on the adjustment.

In aspects, a coordinating user equipment (UE) confirms, with a network entity, a training schedule that indicates a time period to maintain one or more fixed machine-learning (ML) architectures of a second portion of an end-to-end (E2E) ML configuration that forms a second set of sub-deep neural networks (sub-DNNs), of an E2E DNN, that transfer wireless-network-based user equipment-coordination set (UECS) communications through an E2E communication. The coordinating UE determines, based on the training schedule, an adjustment to the first portion of the E2E ML configuration that forms the first set of sub-DNNs that transfer the local-wireless-network-based UECS communications through the E2E communication. In response to determining the adjustment, the coordinating UE directs one or more additional UEs participating in the UECS to update one or more sub-DNNs of the first set of sub-DNNs using the adjustment to the first portion of the E2E ML configuration.

Example Environments

FIG. 1 illustrates an example environment 100, which includes multiple user equipment 110 (UE 110), illustrated as UE 111, UE 112, and UE 113. Each UE 110 can communicate with one or more base stations 120 (illustrated as base stations 121 and 122) through one or more wireless communication links 130 (wireless link 130), illustrated as wireless link 131. Each UE 110 in a UECS 108 (illustrated as UE 111, UE 112, and UE 113) can communicate with a coordinating UE of the UECS and/or a target UE in the UECS through one or more local wireless network connections (e.g., WLAN, Bluetooth, NFC, a personal area network (PAN), WiFi-Direct, IEEE 802.15.4, ZigBee, Thread, millimeter wavelength communication (mmWave), or the like) such as local wireless network connections 133, 134, and 135. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base station, or the like, or any combination thereof.

The base stations 120 communicate with the user equipment 110 using the wireless link 131 and, which may be implemented as any suitable type of wireless link. The wireless link 131 includes control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation or multi-connectivity to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN, or NR RAN). The base stations 121 and 122 in the RAN 140 are connected to a core network 150. The base stations 121 and 122 connect, at 102 and 104 respectively, to the core network 150 through an NG2 interface for control-plane information and using an NG3 interface for user-plane data communications when connecting to a 5G core network, or using an S1 interface for control-plane information and user-plane data communications when connecting to an Evolved Packet Core (EPC) network. The base stations 121 and 122 can communicate using an Xn Application Protocol (XnAP) through an Xn interface or using an X2 Application Protocol (X2AP) through an X2 interface, at interface 106, to exchange user-plane data and control-plane information. The user equipment 110 may connect, via the core network 150, to public networks, such as the Internet 160 to interact with a remote service 170.

The base station 121 can specify a set of UEs (e.g., the UE 111, UE 112, and UE 113) to form a UECS (e.g., the UECS 108) for joint-transmission and joint-reception of signals for a target UE (e.g., the UE 112). The base station 121 may select UE 111 to act as the coordinating UE since the UE 111 is located between UE 112 and UE 113 or because the UE 111 is capable of communicating with each of the other UEs 112 and 113 in the UECS. The base station 121 selects UE 111 to coordinate messages and in-phase and quadrature (I/Q) samples sent between the base station 121 and the UEs 111, 112, 113 for the target UE 112. Communication among the UEs can occur using a local wireless network, such as a PAN, NFC, Bluetooth, WiFi-Direct, local mmWave link, etc. In this example, all three of the UEs 111, 112, 113 receive RF signals from the base station 121. The UE 111, UE 112, and UE 113 demodulate the RF signals to produce baseband I/Q analog signals and sample the baseband I/Q analog signals to produce I/Q samples. The UE 112 and the UE 113 forward the I/Q samples along with system timing information (e.g., system frame number (SFN)) using the local wireless network to the coordinating UE 111 using its own local wireless network transceiver. The coordinating UE 111 then uses the timing information to synchronize and combine the I/Q samples and processes the combined signal to decode data packets for the target UE 112. The coordinating UE 111 then transmits the data packets to the target UE 112 using the local wireless network.

When the target UE 112 has uplink data to send to the base station 121, the target UE transmits the uplink data to the coordinating UE 111 that uses the local wireless network to distribute the uplink data, as I/Q samples, to each UE in the UECS 108. Each UE in the UECS 108 synchronizes with the base station 121 for timing information and its data transmission resource assignment. Then, all three UEs in the UECS 108 jointly transmit the uplink data to the base station 121. The base station 121 receives the transmitted uplink data from the UEs 111, 112, 113 and jointly processes the combined signal to decode the uplink data from the target UE 112.

Example Devices

Figure 2:
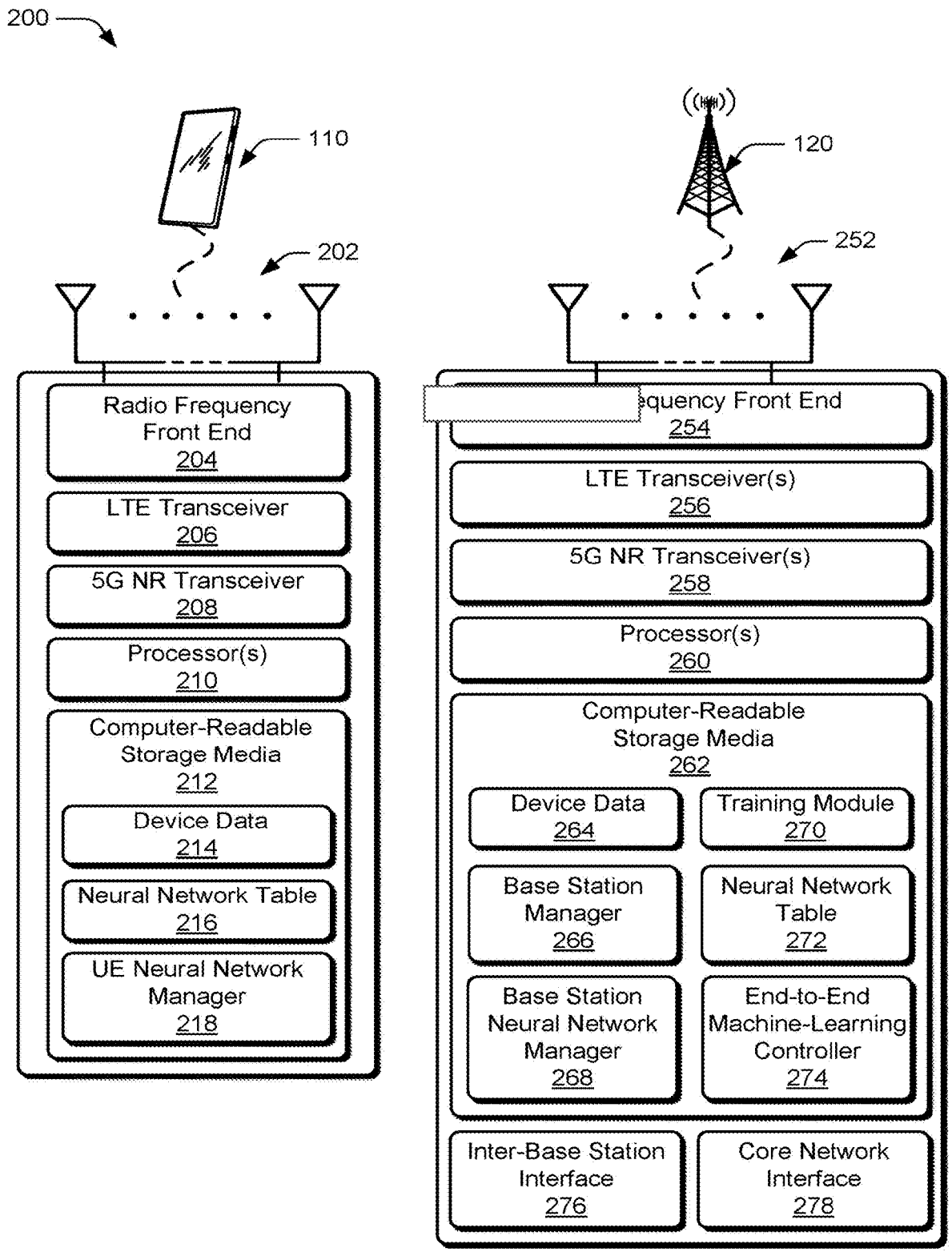
FIG. 2 illustrates an example device diagram of devices that can implement various aspects of DNN processing for a UECS.
Figure 3:
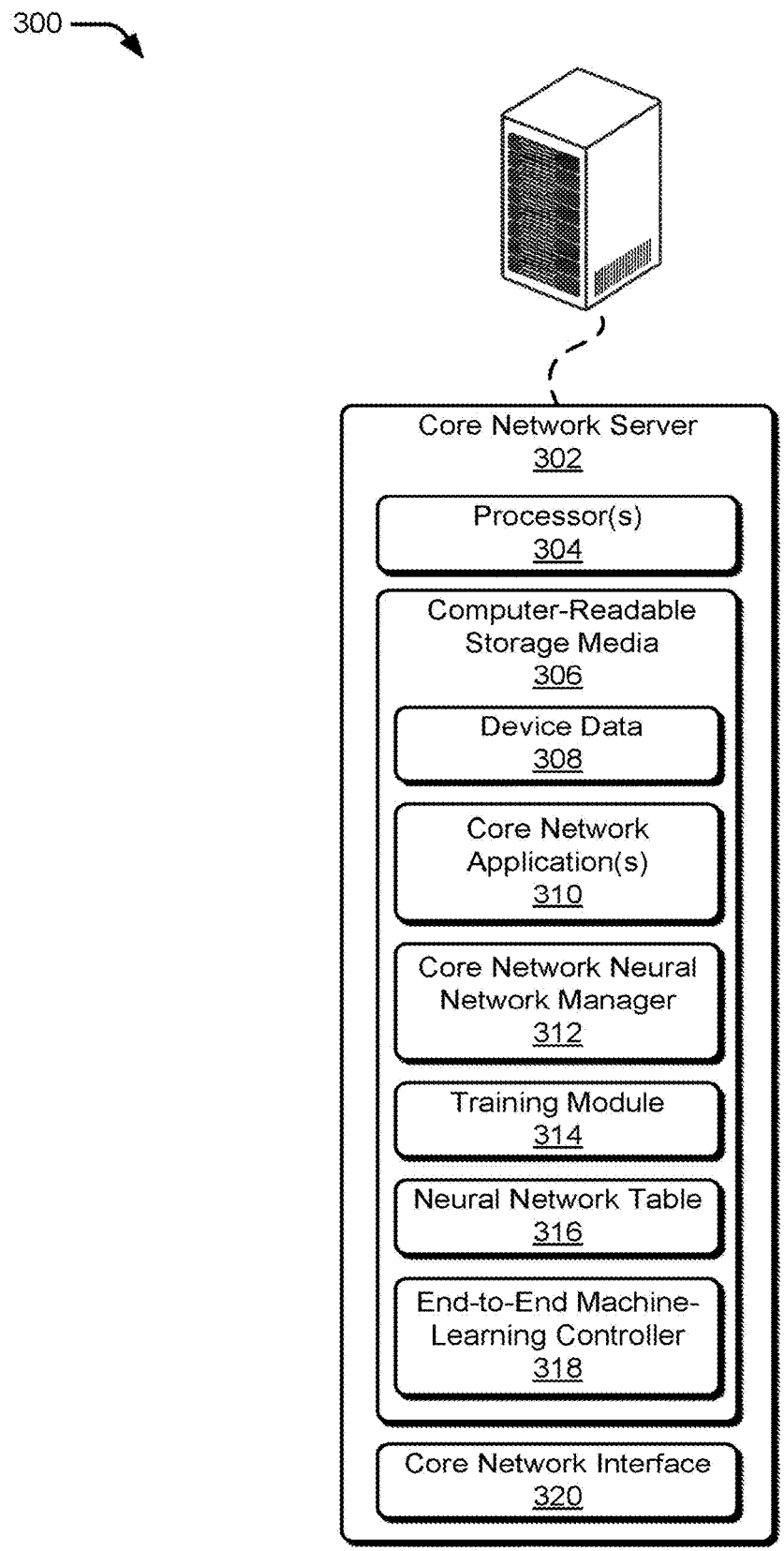
FIG. 3 illustrates an example device diagram of a device that can implement various aspects of DNN processing for a UECS.

FIG. 2 illustrates an example device diagram 200 of the UE 110 and one of the base stations 120 that can implement various aspects of DNN processing for a UECS. FIG. 3 illustrates an example device diagram 300 of a core network server 302 that can implement various aspects of DNN processing for a UECS. The UE 110, the base station 120, and/or the core network server 302 may include additional functions and interfaces that are omitted from FIG. 2 or FIG. 3 for the sake of clarity.

The UE 110 includes antennas 202, a radio frequency front end 204 (RF front end 204), a wireless transceiver (e.g., an LTE transceiver 206, and/or a 5G NR transceiver 208) for communicating with the base station 120 in the RAN 140. The RF front end 204 of the user equipment 110 can couple or connect the LTE transceiver 206, and the 5G NR transceiver 208 to the antennas 202 to facilitate various types of wireless communication. The antennas 202 of the user equipment 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base station 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards.

The UE 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beam-forming codebooks, applications, neural network (NN) tables, and/or an operating system of the UE 110, which are executable by processor(s) 210 to enable user-plane data, control-plane information, and user interaction with the user equipment 110.

In aspects, the CRM 212 includes a neural network table 216 that stores various architecture and/or parameter configurations that form a neural network, such as, by way of example and not of limitation, parameters that specify a fully connected layer neural network architecture, a convolutional layer neural network architecture, a recurrent neural network layer, a number of connected hidden neural network layers, an input layer architecture, an output layer architecture, a number of nodes utilized by the neural network, coefficients (e.g., weights and biases) utilized by the neural network, kernel parameters, a number of filters utilized by the neural network, strides/pooling configurations utilized by the neural network, an activation function of each neural network layer, interconnections between neural network layers, neural network layers to skip, and so forth. Accordingly, the neural network table 216 includes any combination of neural network formation configuration elements (NN formation configuration elements), such as architecture and/or parameter configurations, that can be used to create a neural network formation configuration (NN formation configuration) that includes a combination of one or more NN formation configuration elements that define and/or form a DNN. In some aspects, a single index value of the neural network table 216 maps to a single NN formation configuration element (e.g., a 1:1 correspondence). Alternatively, or additionally, a single index value of the neural network table 216 maps to a NN formation configuration (e.g., a combination of NN formation configuration elements). In some implementations, the neural network table includes input characteristics for each NN formation configuration element and/or NN formation configuration, where the input characteristics describe properties about the training data used to generate the NN formation configuration element and/or NN formation configuration as further described.

The CRM 212 may also include a user equipment neural network manager 218 (UE neural network manager 218). Alternatively, or additionally, the UE neural network manager 218 may be implemented in whole or part as hardware logic or circuitry integrated with or separate from other components of the user equipment 110. The UE neural network manager 218 accesses the neural network table 216, such as by way of an index value, and forms a DNN using the NN formation configuration elements specified by a NN formation configuration. This includes updating the DNN with any combination of architectural changes and/or parameter changes to the DNN as further described, such as a small change to the DNN that involves updating parameters and/or a large change that reconfigures node and/or layer connections of the DNN. In implementations, the UE neural network manager forms multiple DNNs to process wireless communications (e.g., downlink communications, uplink communications).

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The base station 120 include antennas 252, a radio frequency front end 254 (RF front end 254), one or more wireless transceivers (e.g. one or more LTE transceivers 256, and/or one or more 5G NR transceivers 258) for communicating with the UE 110. The RF front end 254 of the base station 120 can couple or connect the LTE transceivers 256 and the 5G NR transceivers 258 to the antennas 252 to facilitate various types of wireless communication. The antennas 252 of the base station 120 may include an array of multiple antennas that are configured similar to, or different from, each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base station 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base station 120. The device data 264 includes network scheduling data, radio resource management data, beamforming codebooks, applications, and/or an operating system of the base station 120, which are executable by processor(s) 260 to enable communication with the UE 110.

CRM 262 also includes a base station manager 266. Alternatively, or additionally, the base station manager 266 may be implemented in whole or part as hardware logic or circuitry integrated with or separate from other components of the base station 120. In at least some aspects, the base station manager 266 configures the LTE transceivers 256 and the 5G NR transceivers 258 for communication with the UE 110, as well as communication with a core network, such as the core network 150.

CRM 262 also includes a base station neural network manager 268 (BS neural network manager 268). Alternatively, or additionally, the BS neural network manager 268 may be implemented in whole or part as hardware logic or circuitry integrated with or separate from other components of the base station 120. In at least some aspects, the BS neural network manager 268 selects the NN formation configurations utilized by the base station 120 and/or UE 110 to configure deep neural networks for processing wireless communications, such as by selecting a combination of NN formation configuration elements to form a DNN for processing UECS communications. In some implementations, the BS neural network manager 268 receives feedback from the UE 110, and selects the NN formation configuration based on the feedback. Alternatively, or additionally, the BS neural network manager 268 receives neural network formation configuration directions from core network 150 elements through a core network interface 278 or an inter-base station interface 276 and forwards the NN formation configuration directions to UE 110. In some aspects, the BS neural network manager 268 selects the NN formation configuration in response to identifying changes in a UECS, such as changes in channel conditions, changes in participating UEs, changes in estimated UE locations, changes in the coordinating UE, and so forth.

The CRM 262 includes a training module 270 and a neural network table 272. In implementations, the base station 120 manages and deploys NN formation configurations to UE 110. Alternatively, or additionally, the base station 120 maintains the neural network table 272. The training module 270 teaches and/or trains DNNs using known input data. For instance, the training module 270 trains DNN(s) for different purposes, such as processing communications transmitted over a wireless communication system (e.g., encoding downlink communications, modulating downlink communications, demodulating downlink communications, decoding downlink communications, encoding uplink communications, modulating uplink communications, demodulating uplink communications, decoding uplink communications, processing UECS communications). This includes training the DNN(s) offline (e.g., while the DNN is not actively engaged in processing the communications) and/or online (e.g., while the DNN is actively engaged in processing the communications).

In implementations, the training module 270 extracts learned parameter configurations from the DNN to identify the NN formation configuration elements and/or NN formation configuration, and then adds and/or updates the NN formation configuration elements and/or NN formation configuration in the neural network table 272. The extracted parameter configurations include any combination of information that defines the behavior of a neural network, such as node connections, coefficients, active layers, weights, biases, pooling, etc.

The neural network table 272 stores multiple different NN formation configuration elements and/or NN formation configurations generated using the training module 270. In some implementations, the neural network table includes input characteristics for each NN formation configuration element and/or NN formation configuration, where the input characteristics describe properties about the training data used to generate the NN formation configuration element and/or NN formation configuration. For instance, the input characteristics include, by way of example and not of limitation, a number of UEs participating in a UECS, an estimated location of a target UE in the UECS, an estimated location of a coordinating UE in the UECS, a type of local wireless network link used by the UECS, power information, signal-to-interference-plus-noise ratio (SINR) information, channel quality indicator (CQI) information, channel state information (CSI), Doppler feedback, frequency bands, BLock Error Rate (BLER), Quality of Service (QoS), Hybrid Automatic Repeat reQuest (HARQ) information (e.g., first transmission error rate, second transmission error rate, maximum retransmissions), latency, Radio Link Control (RLC), Automatic Repeat reQuest (ARQ) metrics, received signal strength (RSS), uplink SINR, timing measurements, error metrics, UE capabilities, BS capabilities, power mode, Internet Protocol (IP) layer throughput, end2end latency, end2end packet loss ratio, etc. Accordingly, the input characteristics include, at times, Layer 1, Layer 2, and/or Layer 3 metrics. In some implementations, a single index value of the neural network table 272 maps to a single NN formation configuration element (e.g., a 1:1 correspondence). Alternatively, or additionally, a single index value of the neural network table 272 maps to a NN formation configuration (e.g., a combination of NN formation configuration elements).

In implementations, the base station 120 synchronizes the neural network table 272 with the neural network table 216 such that the NN formation configuration elements and/or input characteristics stored in one neural network table is replicated in the second neural network table. Alternatively, or additionally, the base station 120 synchronizes the neural network table 272 with the neural network table 216 such that the NN formation configuration elements and/or input characteristics stored in one neural network table represent complementary functionality in the second neural network table (e.g., NN formation configuration elements for transmitter path processing in the first neural network table, NN formation configuration elements for receiver path processing in the second neural network table).

In aspects, the CRM 262 also includes an end-to-end machine-learning controller 274 (E2E ML controller 274). The E2E ML controller 274 determines an end-to-end machine-learning configuration (E2E ML configuration) for processing information transferred through an E2E communication, such as determining an E2E ML configuration for processing UECS communications through the E2E communication as further described. Alternatively, or additionally, the E2E ML controller analyzes any combination of ML capabilities (e.g., supported ML architectures, supported number of layers, available processing power, memory limitations, available power budget, fixed-point processing vs. floating point processing, maximum kernel size capability, computation capability) of devices participating in the E2E communication. In some implementations, the E2E ML controller obtains metrics (e.g., signal quality parameters, link quality parameters) that characterize a current operating environment and analyzes the current operating environment to determine the E2E ML configuration. To illustrate, the E2E ML controller receives any combination of: a received signal strength indicator (RSSI), power information, signal-to-interference-plus-noise ratio (SINR) information, reference signal receive power (RSRP), channel quality indicator (CQI) information, channel state information (CSI), Doppler feedback, BLock Error Rate (BLER), Quality of Service (QoS), Hybrid Automatic Repeat reQuest (HARM) information (e.g., first transmission error rate, second transmission error rate, maximum retransmissions), uplink SINR, timing measurements, error metrics, etc. This includes determining an E2E ML configuration that includes an architecture configuration in combination with parameter configuration(s) that define a DNN or determining an E2E ML configuration that simply includes parameter configurations used to update the DNN.

In determining the E2E ML configuration, the E2E ML controller sometimes determines partitions to the E2E ML configuration that distribute the processing functionality associated with the E2E ML configuration across multiple devices. For clarity, FIG. 2 illustrates the E2E ML controller 274 as separate from the BS neural network manager 268, but in alternative or additional implementations, the BS neural network manager 268 includes functionality performed by the E2E ML controller 274 or vice versa.

The base station 120 also includes an inter-base station interface 276, such as an Xn and/or X2 interface, which the base station manager 266 configures to exchange user-plane data, control-plane information, and/or other data/information between other base stations, to manage the communication of the base station 120 with the UE 110. The base station 120 includes a core network interface 278 that the base station manager 266 configures to exchange user-plane data, control-plane information, and/or other data/information with core network functions and/or entities.

In FIG. 3, the core network server 302 may provide all or part of a function, entity, service, and/or gateway in the core network 150. Each function, entity, service, and/or gateway in the core network 150 may be provided as a service in the core network 150, distributed across multiple servers, or embodied on a dedicated server. For example, the core network server 302 may provide all or a portion of the services or functions of a User Plane Function (UPF), an Access and Mobility Management Function (AMF), a Serving Gateway (S-GW), a Packet Data Network Gateway (P-GW), a Mobility Management Entity (MME), an Evolved Packet Data Gateway (ePDG), and so forth. The core network server 302 is illustrated as being embodied on a single server that includes processor(s) 304 and computer-readable storage media 306 (CRM 306). The processor 304 may be a single core processor or a multiple core processor composed of a variety of materials, such as silicon, polysilicon, high-K dielectric, copper, and so on. CRM 306 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 308 of the core network server 302. The device data 308 includes data to support a core network function or entity, and/or an operating system of the core network server 302, which are executable by processor(s) 304.

CRM 306 also includes one or more core network applications 310, which, in one implementation, is embodied on CRM 306 (as shown). The one or more core network applications 310 may implement the functionality such as UPF, AMF, S-GW, P-GW, MME, ePDG, and so forth. Alternatively, or additionally, the one or more core network applications 310 may be implemented in whole or part as hardware logic or circuitry integrated with or separate from other components of the core network server 302.

CRM 306 also includes a core network neural network manager 312 that manages NN formation configurations used to form DNNs for processing communications transferred between the UE 110 and the base station 120, such as UECS communications that involve multiple UEs and/or the addition of local wireless network connections in the E2E communication. In aspects, the core network neural network manager 312 analyzes various characteristics about a UECS (e.g., number of participating devices, estimated location of the target UE, estimated location of participating UEs, a type of local wireless network connection) and selects an end-to-end machine-learning configuration (E2E ML configuration) that can be used to form an end-to-end deep neural network (E2E DNN) that processes UECS communications transferred through the E2E communication. In aspects, the core network neural network manager 312 selects one or more NN formation configurations within the neural network table 316 to indicate the determined E2E ML configuration.

In some implementations, the core network neural network manager 312 analyzes various criteria, such as current signal channel conditions (e.g., as reported by base station 120, as reported by other wireless access points, as reported by UEs 110 (via base stations or other wireless access points)), capabilities of the base station 120 (e.g., antenna configurations, cell configurations, MIMO capabilities, radio capabilities, processing capabilities), capabilities of the UE 110 (e.g., antenna configurations, MIMO capabilities, radio capabilities, processing capabilities), and so forth. For example, the base station 120 obtains the various criteria and/or link quality indications (e.g., RSSI, power information, SINR, RSRP, CQI, CSI, Doppler feedback, BLER, HARQ, timing measurements, error metrics, etc.) during the communications with the UE and forwards the criteria and/or link quality indications to the core network neural network manager 312. The core network neural network manager selects, based on these criteria and/or indications, an E2E ML configuration that improves the accuracy (e.g., lower bit errors, higher signal quality) of a DNN processing the communications. The core network neural network manager 312 then communicates the E2E ML configuration to the base stations 120 and/or the UE 110, such as by communicating indices of the neural network table. In implementations, the core network neural network manager 312 receives UE and/or BS feedback from the base station 120 and selects an updated E2E ML configuration based on the feedback.

The CRM 306 includes a training module 314 and a neural network table 316. In implementations, the core network server 302 manages and deploys E2E ML configurations and/or portions of a partitionable E2E ML configuration to multiple devices (e.g., UE 110, base station 120) in a wireless communication system. Alternatively, or additionally, the core network server maintains the neural network table 316 outside of the CRM 306. The training module 314 teaches and/or trains DNNs using known input data. For instance, the training module 314 trains DNN(s) to process different types of pilot communications transmitted over a wireless communication system. This includes training the DNN(s) offline and/or online. In implementations, the training module 314 extracts a learned NN formation configuration and/or learned NN formation configuration elements from the DNN and stores the learned NN formation configuration elements in the neural network table 316, such as an NN formation configuration that can be selected by the core network neural network manager 312 as an E2E ML configuration to form an E2E DNN as further described. Thus, a NN formation configuration includes any combination of architecture configurations (e.g., node connections, layer connections) and/or parameter configurations (e.g., weights, biases, pooling) that define or influence the behavior of a DNN. In some implementations, a single index value of the neural network table 316 maps to a single NN formation configuration element (e.g., a 1:1 correspondence). Alternatively, or additionally, a single index value of the neural network table 316 maps to a NN formation configuration (e.g., a combination of NN formation configuration elements).

In some implementations, the training module 314 of the core network neural network manager 312 generates complementary NN formation configurations and/or NN formation configuration elements to those stored in the neural network table 216 at the UE 110 and/or the neural network table 272 at the base station 120. As one example, the training module 314 generates the neural network table 316 with NN formation configurations and/or NN formation configuration elements that have a high variation in the architecture and/or parameter configurations relative to medium and/or low variations used to generate the neural network table 272 and/or the neural network table 216. For instance, the NN formation configurations and/or NN formation configuration elements generated by the training module 314 correspond to fully connected layers, a full kernel size, frequent sampling and/or pooling, high weighting accuracy, and so forth. Accordingly, the neural network table 316 includes, at times, high accuracy neural networks with the trade-off of increased processing complexity and/or time.

The neural network table 316 stores multiple different NN formation configuration elements generated using the training module 314. In some implementations, the neural network table includes input characteristics for each NN formation configuration element and/or NN formation configuration, where the input characteristics describe properties about the training data used to generate the NN formation configuration. For instance, the input characteristics can include a number of UEs participating in a UECS, an estimated location of a target UE in the UECS, an estimated location of a coordinating UE in the UECS, a type of local wireless network link used by the UECS, power information, SINR information, CQI, CSI, Doppler feedback, RSS, error metrics, minimum end-to-end (E2E) latency, desired E2E latency, E2E QoS, E2E throughput, E2E packet loss ratio, cost of service, etc.

The CRM 306 also includes an end-to-end machine-learning controller 318 (E2E ML controller 318). The E2E ML controller 318 determines an end-to-end machine-learning configuration (E2E ML configuration) for processing information transferred through an E2E communication, such as determining an E2E ML configuration for processing UECS communications through the E2E communication as further described. Alternatively, or additionally, the E2E ML controller analyzes any combination of ML capabilities (e.g., supported ML architectures, supported number of layers, available processing power, memory limitations, available power budget, fixed-point processing vs. floating point processing, maximum kernel size capability, computation capability) of devices participating in the E2E communication. In some implementations, the E2E ML controller obtains metrics (e.g., signal quality parameters, link quality parameters) that characterize a current operating environment and analyzes the current operating environment to determine the E2E ML configuration. This includes determining an E2E ML configuration that includes an architecture configuration in combination with parameter configuration(s) that define a DNN or determining an E2E ML configuration that simply includes parameter configurations used to update the DNN.

In determining the E2E ML configuration, the E2E ML controller 318 sometimes determines partitions to the E2E ML configuration that distribute the processing functionality associated with the E2E ML configuration across multiple devices. For clarity, FIG. 3 illustrates the E2E ML controller 318 as separate from the core network neural network manager 312, but in alternative or additional implementations, the core network neural network manager 312 includes functionality performed by the E2E ML controller 318 or vice versa.

The core network server 302 also includes a core network interface 320 for communication of user-plane data, control-plane information, and other data/information with the other functions or entities in the core network 150, base stations 120, or UE 110. In implementations, the core network server 302 communicates E2E ML configuration, or portions of a partitionable E2E ML configuration, to the base station 120 using the core network interface 320. The core network server 302 alternatively, or additionally receives feedback from the base stations 120 and/or the UE 110, by way of the base stations 120, using the core network interface 320.

Configurable Machine-Learning Modules

Figure 4:
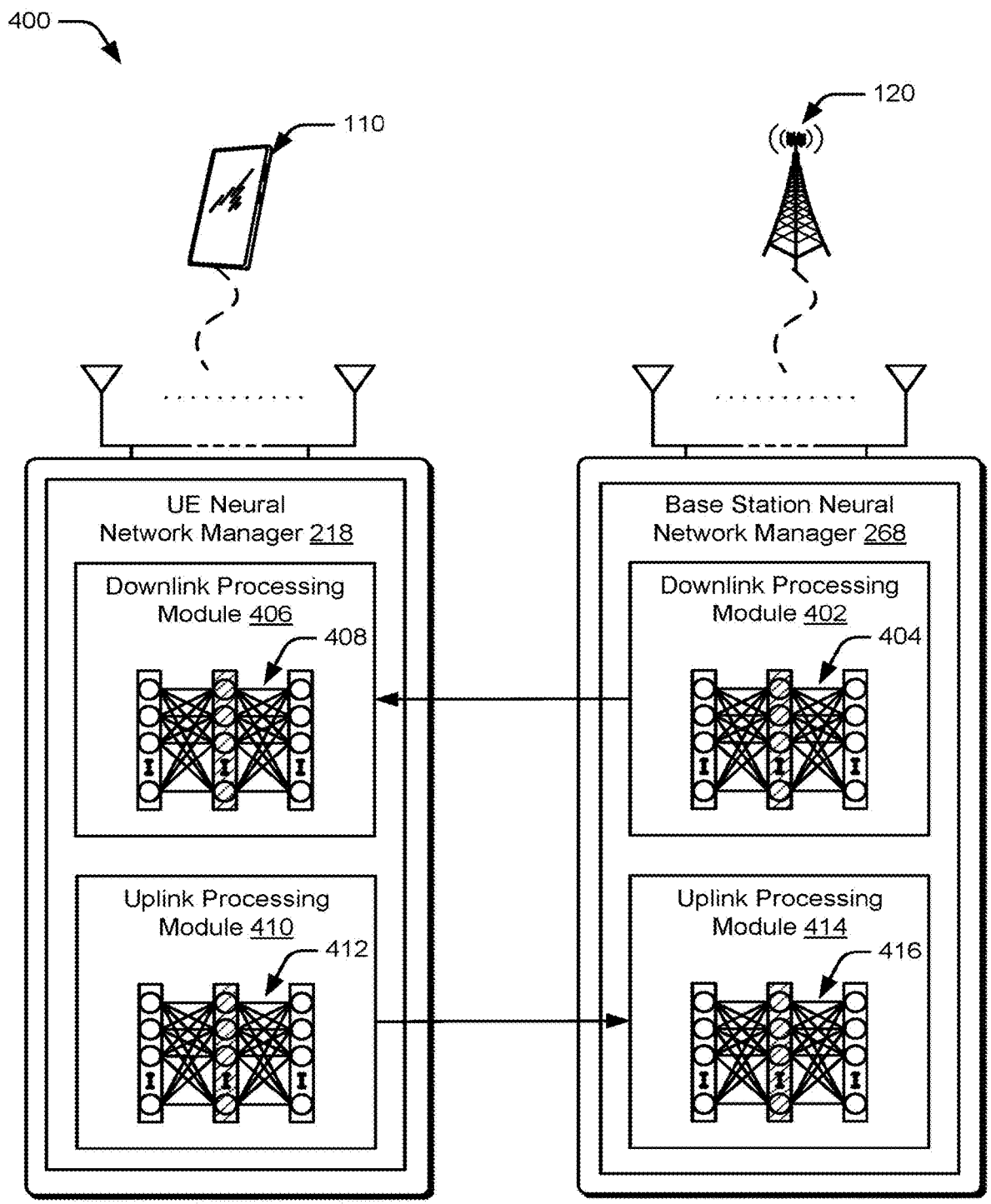
FIG. 4 illustrates an example operating environment in which multiple deep neural networks are utilized in a wireless communication system in accordance with aspects of DNN processing for a UECS.

FIG. 4 illustrates an example operating environment 400 that includes UE 110 and base station 120 that can implement various aspects of DNN processing for a UECS. In implementations, the UE 110 and base station 120 exchange communications with one another over a wireless communication system by processing the communications using multiple DNNs.

The base station neural network manager 268 of the base station 120 includes a downlink processing module 402 for processing downlink communications, such as for generating downlink communications transmitted to the UE 110. To illustrate, the base station neural network manager 268 forms deep neural network(s) 404 (DNNs 404) in the downlink processing module 402 using an E2E ML configuration and/or a portion of an E2E ML configuration as further described. In aspects, the DNNs 404 perform some or all of a transmitter processing chain functionality used to generate downlink communications, such as a processing chain that receives input data, progresses to an encoding stage, followed by a modulating stage, and then a radio frequency (RF) analog transmit (Tx) stage. To illustrate, the DNNs 404 can perform convolutional encoding, serial-to-parallel conversion, cyclic prefix insertion, channel coding, time/frequency interleaving, and so forth. In some aspects, the DNN 404 processes downlink UECS communications.

Similarly, the UE neural network manager 218 of the UE 110 includes a downlink processing module 406, where the downlink processing module 406 includes deep neural network(s) 408 (DNNs 408) for processing (received) downlink communications. In various implementations, the UE neural network manager 218 forms the DNNs 408 using an E2E ML configuration and/or a portion of an E2E ML configuration as further described. In aspects, the DNNs 408, perform some or all receiver processing functionality for (received) downlink communications, such as complementary processing to the processing performed by the DNNs 404 (e.g., an RF analog receive (Rx) stage, a demodulating stage, a decoding stage). To illustrate the DNNs 408 can perform any combination of extracting data embedded on the Rx signal, recovering, recovering binary data, correcting for data errors based on forward error correction applied at the transmitter block, extracting payload data from frames and/or slots, and so forth.

The base station 120 and/or the UE 110 also process uplink communications using DNNs. In environment 400, the UE neural network manager 218 includes an uplink processing module 410, where the uplink processing module 410 includes deep neural network(s) 412 (DNNs 412) for generating and/or processing uplink communications (e.g., encoding, modulating). In other words, uplink processing module 410 processes pre-transmission communications as part of processing the uplink communications. The UE neural network manager 218, for example, forms the DNNs 412 using an E2E ML configuration and/or a portion of an E2E ML configuration to perform some or all of the transmitter processing functionality used to generate uplink communications transmitted from the UE 110 to the base station 120.

Similarly, uplink processing module 414 of the base station 120 includes deep neural network(s) 416 (DNNs 416) for processing (received) uplink communications, where the base station neural network manager 268 forms DNNs 416 using an E2E ML configuration and/or a portion of an E2E ML configuration to perform some or all receiver processing functionality for (received) uplink communications, such as uplink communications received from the UE 110. At times, the DNNs 412 and the DNNs 416 perform complementary functionality of one another.

Generally, a deep neural network (DNN) corresponds to groups of connected nodes that are organized into three or more layers. The nodes between layers are configurable in a variety of ways, such as a partially connected configuration where a first subset of nodes in a first layer are connected with a second subset of nodes in a second layer, or a fully connected configuration where each node in a first layer are connected to each node in a second layer, etc. The nodes can use a variety of algorithms and/or analysis to generate output information based upon adaptive learning, such as single linear regression, multiple linear regression, logistic regression, step-wise regression, binary classification, multiclass classification, multi-variate adaptive regression splines, locally estimated scatterplot smoothing, and so forth. At times, the algorithm(s) include weights and/or coefficients that change based on adaptive learning. Thus, the weights and/or coefficients reflect information learned by the neural network.

A neural network can also employ a variety of architectures that determine what nodes within the neural network are connected, how data is advanced and/or retained in the neural network, what weights and coefficients are used to process the input data, how the data is processed, and so forth. These various factors collectively describe a NN formation configuration. To illustrate, a recurrent neural network, such as a long short-term memory (LSTM) neural network, forms cycles between node connections in order to retain information from a previous portion of an input data sequence. The recurrent neural network then uses the retained information for a subsequent portion of the input data sequence. As another example, a feed-forward neural network passes information to forward connections without forming cycles to retain information. While described in the context of node connections, it is to be appreciated that the NN formation configuration can include a variety of parameter configurations that influence how the neural network processes input data.

A NN formation configuration of a neural network can be characterized by various architecture and/or parameter configurations. To illustrate, consider an example in which the DNN implements a convolutional neural network. Generally, a convolutional neural network corresponds to a type of DNN in which the layers process data using convolutional operations to filter the input data. Accordingly, the convolutional NN formation configuration can be characterized with, by way of example and not of limitation, pooling parameter(s) (e.g., specifying pooling layers to reduce the dimensions of input data), kernel parameter(s) (e.g., a filter size and/or kernel type to use in processing input data), weights (e.g., biases used to classify input data), and/or layer parameter(s) (e.g., layer connections and/or layer types). While described in the context of pooling parameters, kernel parameters, weight parameters, and layer parameters, other parameter configurations can be used to form a DNN. Accordingly, a NN formation configuration can include any other type of parameter that can be applied to a DNN that influences how the DNN processes input data to generate output data. An E2E ML configuration uses one or more NN formation configurations to form E2E DNNs that process communications from one endpoint to another endpoint. For example, a partitionable E2E ML configuration may use a respective NN formation configuration for each partition.

Figure 5:
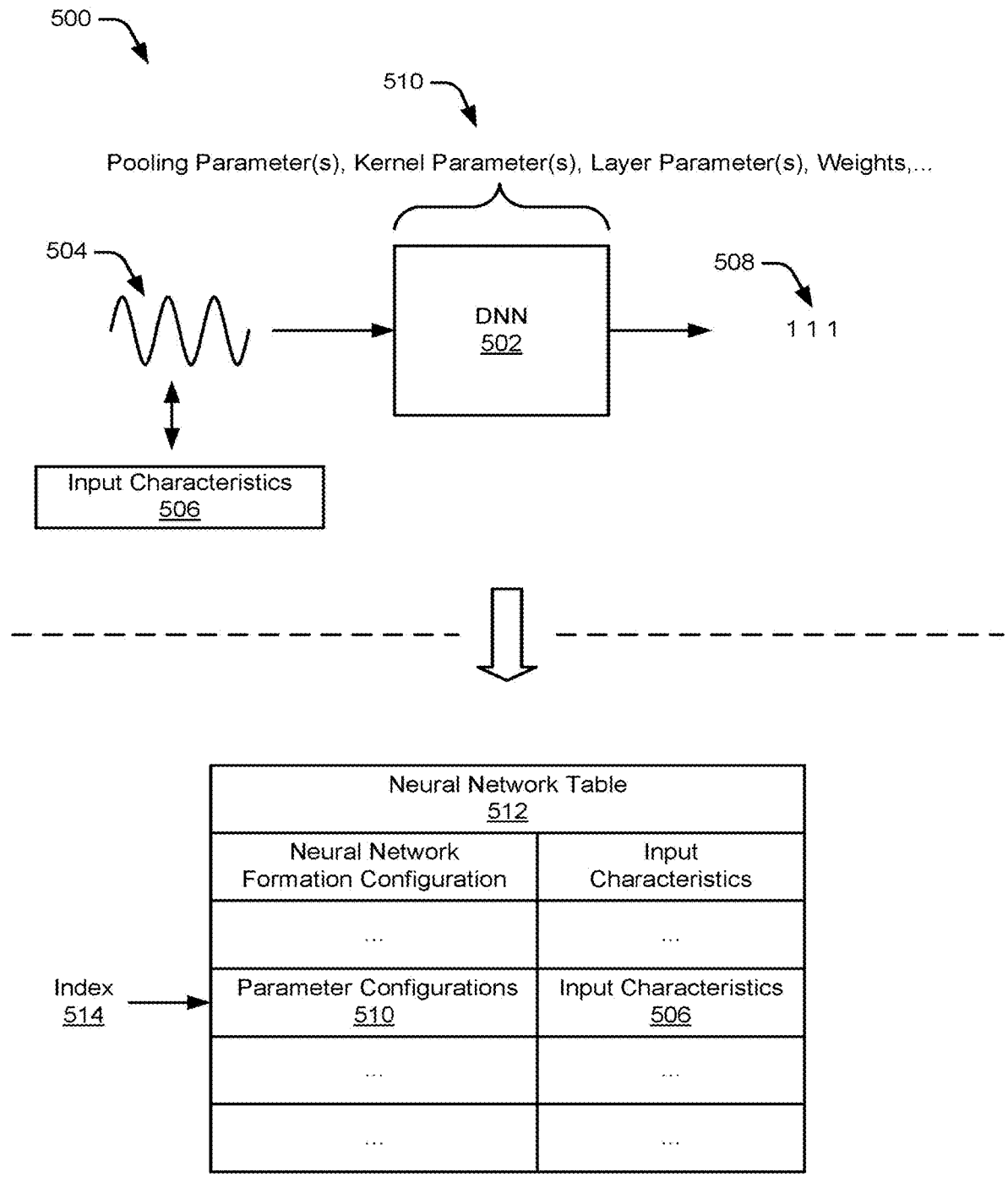
FIG. 5 illustrates an example of generating multiple neural network formation configurations in accordance with aspects of DNN processing for a UECS.

FIG. 5 illustrates an example 500 that describes aspects of generating multiple NN formation configurations in accordance with DNN processing for a UECS. At times, various aspects of the example 500 are implemented by any combination of the training module 270, the base station neural network manager 268, the core network neural network manager 312, and/or the training module 314 of FIG. 2 and FIG. 3.

The upper portion of FIG. 5 includes a DNN 502 that represents any suitable DNN used to implement DNN processing for a UECS. In implementations, a neural network manager determines to generate different NN formation configurations, such as NN formation configurations for processing UECS communications. Alternatively, or additionally, the neural network generates NN formation configurations based on different transmission environments and/or transmission channel conditions. Training data 504 represents an example input to the DNN 502, such as data corresponding to a downlink communication and/or uplink communication with a particular operating configuration and/or a particular transmission environment. To illustrate, the training data 504 can include digital samples of a downlink wireless signal, recovered symbols, recovered frame data, binary data, etc. In some implementations, the training module generates the training data mathematically or accesses a file that stores the training data. Other times, the training module obtains real-world communications data. Thus, the training module can train the DNN 502 using mathematically generated data, static data, and/or real-world data. Some implementations generate input characteristics 506 that describe various qualities of the training data, such as an operating configuration, transmission channel metrics, UE capabilities, UE velocity, a number of UEs participating in a UECS, an estimated location of a target UE in the UECS, an estimated location of a coordinating UE in the UECS, a type of local wireless network link used by the UECS, and so forth.

The DNN 502 analyzes the training data and generates an output 508 represented here as binary data. Some implementations iteratively train the DNN 502 using the same set of training data and/or additional training data that has the same input characteristics to improve the accuracy of the machine-learning module. During training, the machine-learning module modifies some or all of the architecture and/or parameter configurations of a neural network included in the machine-learning module, such as node connections, coefficients, kernel sizes, etc. At some point in the training, the training module determines to extract the architecture and/or parameter configurations 510 of the neural network (e.g., pooling parameter(s), kernel parameter(s), layer parameter(s), weights), such as when the training module determines that the accuracy meets or exceeds a desired threshold, the training process meets or exceeds an iteration number, and so forth. The training module then extracts the architecture and/or parameter configurations from the machine-learning module to use as a NN formation configuration and/or NN formation configuration element(s). The architecture and/or parameter configurations can include any combination of fixed architecture and/or parameter configurations, and/or variable architectures and/or parameter configurations.

The lower portion of FIG. 5 includes a neural network table 512 that represents a collection of NN formation configuration elements, such as neural network table 216, neural network table 272, and/or neural network table 316 of FIG. 2 and FIG. 3. The neural network table 512 stores various combinations of architecture configurations, parameter configurations, and input characteristics, but alternative implementations omit the input characteristics from the table. Various implementations update and/or maintain the NN formation configuration elements and/or the input characteristics as the DNN learns additional information. For example, at index 514, the neural network manager and/or the training module updates neural network table 512 to include architecture and/or parameter configurations 510 generated by the DNN 502 while analyzing the training data 504. At a later point in time, such as when determining an E2E ML configuration for processing UECS communications in an E2E communication, the neural network manager selects one or more NN formation configurations from the neural network table 512 by matching the input characteristics to a current operating environment and/or configuration, such as by matching the input characteristics to current channel conditions, the number of UEs participating in a UECS, an estimated location of a target UE in the UECS, an estimated location of a coordinating UE in the UECS, a type of local wireless network link used by the UECS, UE capabilities, UE characteristics (e.g., velocity, location, etc.) and so forth.

DNN Processing for a UECS

A UECS enhances a target UE's ability to transmit and receive communications with a base station by generally acting as a distributed antenna of a target UE. To illustrate, a base station transmits, using a wireless network, downlink data packets using radio frequency (RF) signals to the multiple UEs in the UECS. A portion or all of the UEs in the UECS receive and demodulate the RF signals into an analog baseband signal and sample the baseband signal to produce a set of in-phase and quadrature (UQ) samples. Each UE transmits the I/Q samples to a coordinating UE over a local wireless network. In some aspects, the UEs transmit timing information with the I/Q samples. Using the timing information, the coordinating UE combines the I/Q samples and processes the combined I/Q samples to decode the user-plane data for the target UE. The coordinating UE then transmits the data packets to the target UE over the local wireless network.

Similarly, when the target UE has uplink data to transmit to the base station, the target UE transmits the uplink data to the coordinating UE, which uses the local wireless network to distribute the uplink data to each UE in the UECS. In some aspects, each UE in the UECS synchronizes with the base station for timing information and a respective data transmission resource assignment. The multiple UEs in the UECS then jointly transmit the uplink data to the base station. The base station receives the jointly-transmitted uplink data from the multiple UEs and processes the combined signal to decode the uplink data from the target UE. By having the multiple UEs form a UECS for joint transmission and reception of data intended for a target UE, the UEs in the UECS coordinate in a manner similar to a distributed antenna for the target UE to improve the effective signal quality between the target UE and the base station.

In aspects, a network entity determines an end-to-end (E2E) machine-learning (ML) configuration that forms an E2E deep neural network (DNN) for processing E2E communications associated with UECS communications. For example, a core network server determines the E2E ML configuration based on any combination of factors, such as a number of devices participating in the UECS, signal and/or link quality parameters, capabilities of one or more devices participating in the UECS, a type of local wireless network connection used between the UEs, estimated location(s) of the target UE and/or other participating UEs, and so forth. The network entity then directs each of the one or more devices to form, using at least a portion of the E2E ML configuration, a respective sub-DNN of the corresponding E2E DNN formed using the E2E ML configuration.

Figure 6:
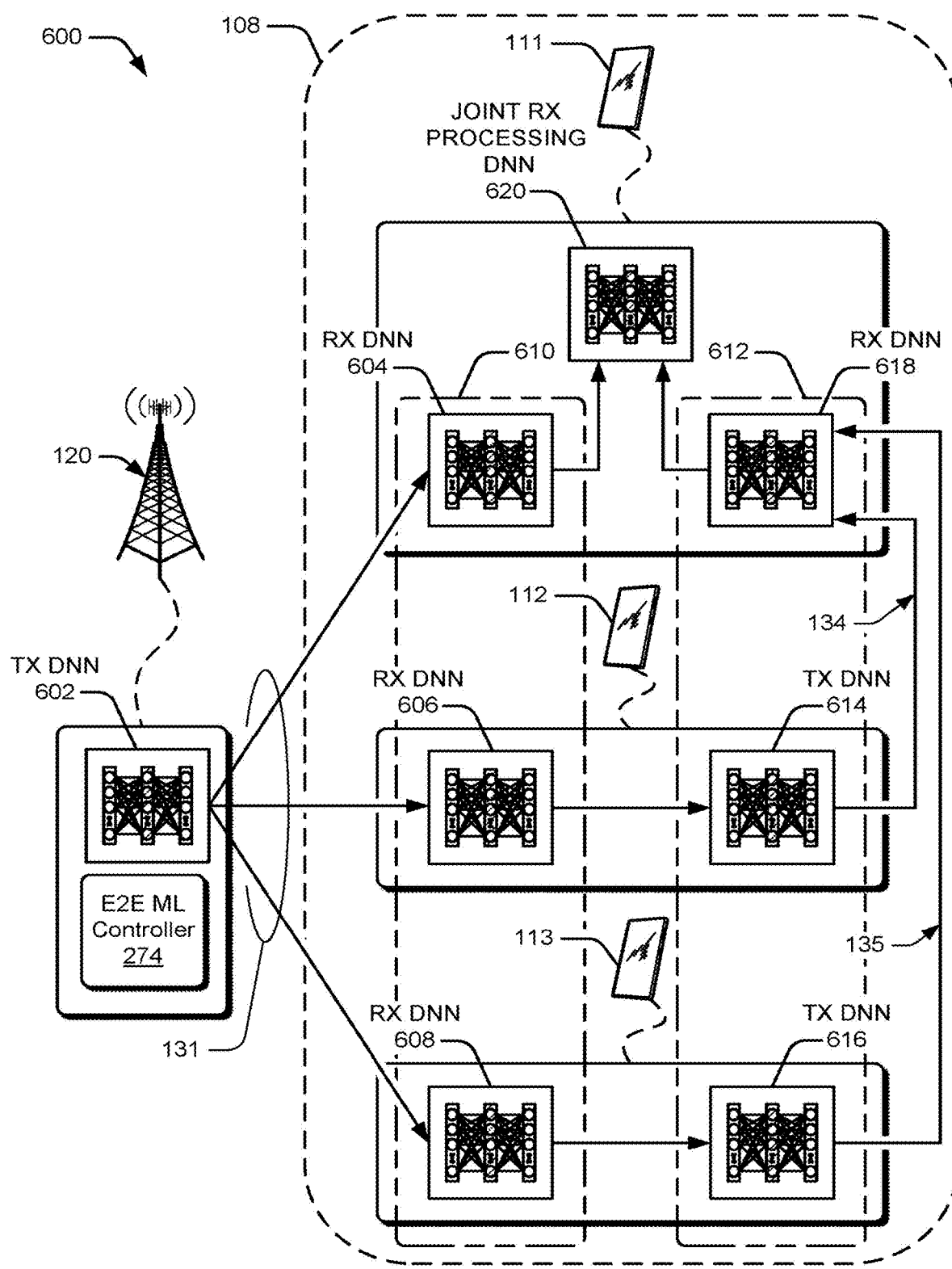
FIG. 6 illustrates an example operating environment in which DNN processing for a UECS can be implemented in accordance with various aspects.

FIG. 6 illustrates an example environment 600 in which DNN processing for a UECS can be implemented in accordance with various aspects. The environment 600 includes the base station 120 and the UECS 108 of FIG. 1, where the UE 111, the UE 112, and the UE 113 of FIG. 1 form the UECS 108. While the environment 600 shows a single base station 120, alternative or additional aspects of DNN processing for a UECS can use multiple base stations, such as an active coordination set (ACS) that includes multiple base stations used for joint wireless communication with the target user equipment as that described with reference to FIG. 8.

In aspects of DNN processing for a UECS, an E2E ML controller, such as the E2E ML controller 274 of the base station 120 or the E2E ML controller 318 of the core network server 302 (not illustrated), determines an E2E ML configuration that forms an E2E DNN for processing UECS communications (e.g., joint reception, joint transmission) transferred through one or more E2E communications. To illustrate, the E2E ML controller determines adjustments to: (a) existing E2E ML configurations, such as small adjustments using parameter updates (e.g., coefficients, weights) to tune existing E2E DNN(s) based on feedback and/or (b) ML architecture changes (e.g., number of layers, layer down-sampling configurations, adding or removing fully convolutional layers) to reconfigure E2E DNN(s). In the environment 600, the E2E ML controller determines a E2E ML configuration that forms a single-directional E2E DNN for processing downlink UECS communications, but in alternative or additional implementations, the E2E ML controller determines E2E ML configurations to form bi-directional E2E DNN(s). In aspects, the E2E ML controller partitions the E2E ML configuration and directs multiple devices to form sub-DNNs of the E2E DNN using the E2E ML configuration partitions.

An E2E ML controller (e.g., E2E ML controller 274, E2E ML controller 318) can determine the E2E ML configurations based on a combination of factors, such as machine-learning (ML) capabilities (e.g., supported ML architectures, supported number of layers, available processing power, memory limitation, available power budget, fixed-point processing vs. floating point processing, maximum kernel size capability, computation capability) of the device(s) or network entities participating in the E2E communication and/or UECS. As another example, the E2E ML controller analyzes a current operating environment, such as by analyzing signal and/or link quality indications (e.g., RSSI, power information, SINR, RSRP, CQI, CSI, Doppler feedback, BLER, HARQ, timing measurements, error metrics, etc.) received from the UE 111, the UE 112, the UE 113 and/or generated by the base station 120.

The E2E ML controller sometimes determines partitions to the E2E ML configuration (and resulting E2E DNN formed with the E2E ML configuration) to distribute processing amongst the various devices participating in the E2E communication. In other words, the E2E ML configuration forms a distributed E2E DNN, where multiple devices implement respective portions of the distributed E2E DNN. For instance, in response to determining the E2E ML configuration associated with processing downlink UECS communications, the E2E ML controller 318 partitions the E2E ML configuration into portions and directs the devices to form respective DNNs based on the portions.

To illustrate, the base station 120 forms a first sub-DNN, labeled as transmit DNN 602 (TX DNN 602), using a first portion of the E2E ML configuration determined by the E2E ML controller. In aspects, the TX DNN 602 processes downlink communication directed towards a target UE of the UECS 108, such as by performing any combination of transmitter processing chain operations that result in one or more downlink transmissions over the wireless link 131 to the UECS 108. For instance, the base station 120, by way of the TX DNN 602, transmits a downlink wireless signal using air interface resources of the (cellular) wireless network. At least some of the UEs of the UECS 108 receive and process the downlink wireless signal using a respective sub-DNN. To illustrate, the UE 111 forms a second sub-DNN, labeled as receive DNN 604 (RX DNN 604) using a second portion of the E2E ML configuration, the UE 112 forms a third sub-DNN, labeled as receive DNN 606 (RX DNN 606) using a third portion of the E2E ML configuration, and the UE 113 forms a fourth sub-DNN, labeled as receive DNN 608 (RX DNN 608), using a fourth portion of the E2E ML configuration.

The RX DNN 604, the RX DNN 606, and the RX DNN 608 form a first set of sub-DNNs 610 directed to processing communications transmitted using the wireless network associated with the base station 120. To illustrate, the RX DNNs 604, 606, and 608 process downlink communications received over the wireless network associated with the base station 120, such as by performing at least some receiver chain operations. As one example, the first set of sub-DNNs 610 receive samples of the downlink wireless signal (or a down-converted version of the downlink wireless signal) from an analog-to-digital converter (ADC) and generate I/Q samples.

In aspects, the UEs in the UECS form a second set of sub-DNNs 612 that process communications transmitted using a side link (e.g., a local wireless network connection). As one example, at least some sub-DNNs in the second set of sub-DNNs 612 correspond to side-link TX DNNs that process the I/Q samples for transmission over the local wireless network connection to a coordinating UE. To illustrate, assume in the environment 600 that the base station 120 directs the UE 111 to act as the coordinating UE and the UEs 112 and 113 to act as (non-coordinating UE) participants of the UECS. As shown in FIG. 6, the UE 112 forms a fifth sub-DNN using a fifth portion of the E2E ML configuration, labeled as transmit DNN 614 (TX DNN 614), that operates as a side-link TX DNN by receiving the output generated by the RX DNN 606, and processing the output to generate a transmission over the local wireless network to the coordinating UE (e.g., UE 111) using the local wireless network connection 134. In alternative or additional implementations, the UE 112 forms a single sub-DNN that includes the functionality of both the RX DNN 606 and the TX DNN 614. Similarly, the UE 113 forms a sixth sub-DNN that operates as a side-link TX DNN using a sixth portion of the E2E ML configuration, labeled as transmit DNN 616 (TX DNN 616), that receives the output generated by the RX DNN 608, and processes the output to generate a transmission over the local wireless network to the coordinating UE (e.g., UE 111) using the local wireless network connection 135. However, in alternative or additional implementations, the UE 113 forms a single sub-DNN that combines the functionality of the RX DNN 608 and the TX DNN 616.

The UE 111, as the coordinating UE, forms, as part of the second set of sub-DNNs 612, a seventh sub-DNN using a seventh portion of the E2E ML configuration, labeled as receive DNN 618 (RX DNN 618), that operates as a side-link RX DNN for receiving the local wireless network communications from various UEs in the UECS and processing the input using various receiver chain operations. As one example, the RX DNN 618 decodes and/or extracts the I/Q samples from the local wireless network connection messages from the UE 112 and/or the UE 113.

The UE 111, as the coordinating UE, also forms an eighth sub-DNN using an eighth portion of the E2E ML configuration, labeled as joint receive processing DNN 620 (joint RX processing DNN 620). In aspects, the joint RX processing DNN 620 receives the baseband I/Q samples generated by various UEs in the UECS and combines the I/Q samples as further described. For example, the joint RX processing DNN 620 receives a first set of I/Q samples generated by the (co-resident) RX DNN 604, a second set of I/Q samples from the UE 112 over the local wireless network connection 134 and through the RX DNN 618, and a third set of I/Q samples from the UE 113 over the local wireless network connection 135 and through the RX DNN 618. The joint RX processing DNN 620 then combines the I/Q samples and processes the combined I/Q samples to recover user-plane data and/or control-plane information intended for the target UE from the downlink communication. Afterwards, if the target UE is separate from the coordinating UE 111, the joint RX processing DNN 620 generates a local wireless network communication that forwards the recovered user-plane data and/or control-plane information to the target UE. Further, while the environment 600 illustrates the UE 112 and the UE 113 forwarding the I/Q samples to the coordinating UE (e.g., UE 111), in some implementations, the UE 112, the UE 113, and/or the UE 111 forward the I/Q samples to the target UE for processing. In other words, the target UE can also be the coordinating UE and include a sub-DNN that receives and processes communications transmitted over the local wireless network connection.

Figure 7:
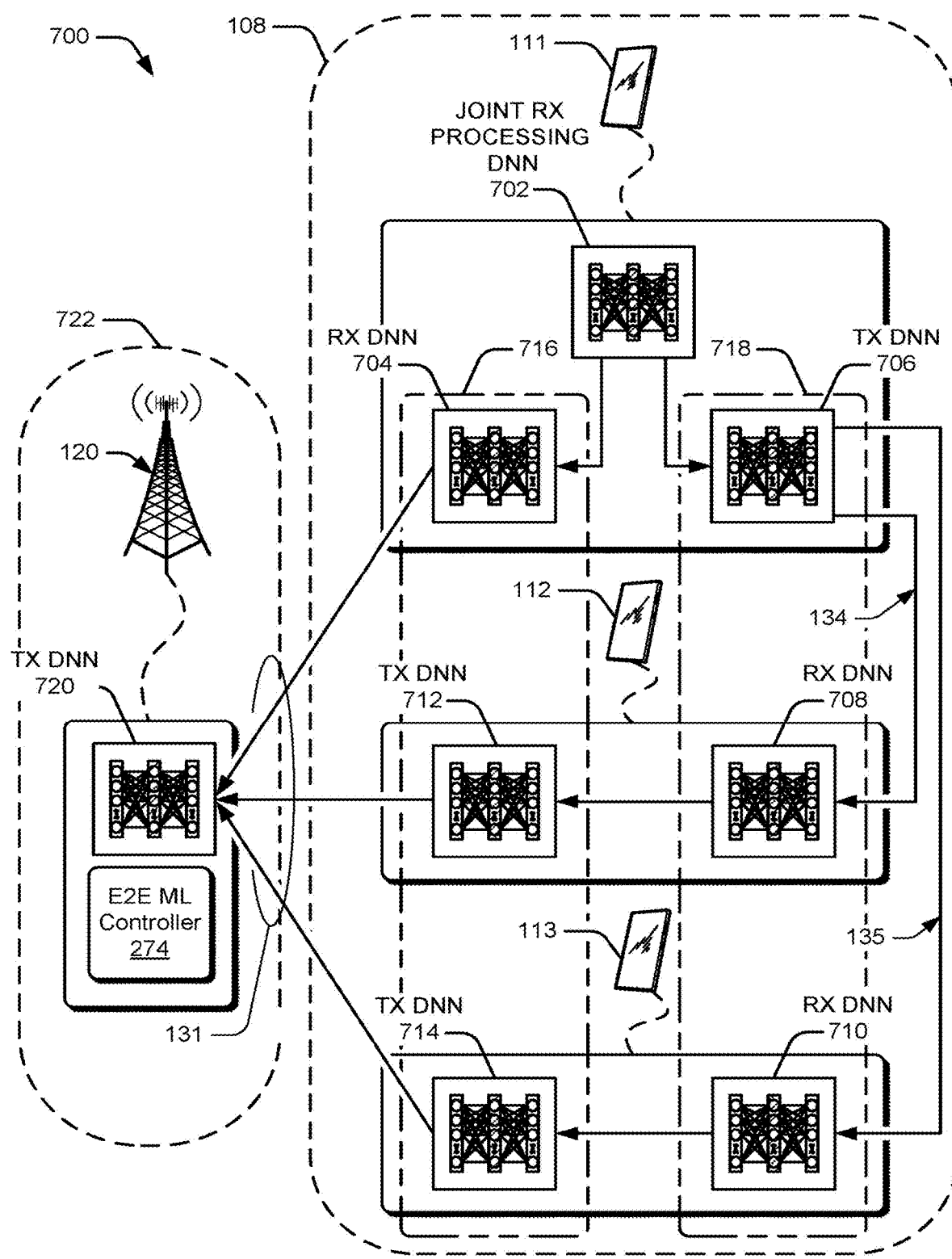
FIG. 7 illustrates an example operating environment in which DNN processing for a UECS can be implemented in accordance with various aspects.

FIG. 7 illustrates an example environment 700 in which DNN processing for a UECS can be implemented in accordance with various aspects. The environment 700 includes the base station 120 and the UECS 108 of FIG. 1, where the UE 111, the UE 112, and the UE 113 of FIG. 1 form the UECS 108. Similar to the example environment 600, an E2E ML controller (e.g., the E2E ML controller 274) determines an E2E ML configuration that forms a single-directional E2E DNN for processing uplink UECS communications. In alternative or additional implementations, the E2E ML controller 318 of the core network server 302 determines the E2E ML configuration.

In aspects of DNN processing for a UECS, the coordinating UE (e.g. UE 111) forms multiple sub-DNNs using portions of the E2E ML configuration. To illustrate, the coordinating UE forms a joint transmit processing DNN 702 (joint TX processing DNN 702), a first transmit DNN 704 (TX DNN 704) and a second transmit DNN 706 (TX DNN 706). The joint TX processing DNN 702 receives and processes uplink user-plane data and/or control plane information from a target UE. For example, as described with reference to FIG. 6, the target UE (e.g., UE 112 or UE 113) includes a side-link TX DNN (e.g., TX DNN 614, TX DNN 616) for transmitting an uplink UECS communication (e.g., uplink user-plane data, control-plane information) over the local wireless network connection (e.g., local wireless network connection 134, local wireless network connection 135) to the coordinating UE. The coordinating UE then receives and processes the uplink UECS communication using the joint TX processing DNN 702. To illustrate, the joint TX processing DNN 702 generates multiple outputs, such as a first output directed towards the TX DNN 704 and a second output directed towards the TX DNN 706.

The TX DNN 704 receives the first output from the joint TX processing DNN 702 and generates an uplink communication for transmission over the (cellular) wireless network to the base station 602. For example, the TX DNN 704 performs at least some transmitter chain operations associated with transmitting the target UE's user-plane data and/or control-plane information over the wireless link 131. At times, the TX DNN 704 applies timing adjustments to the uplink transmission.

The TX DNN 706 operates as a side-link TX DNN by receiving the second output from the joint TX processing DNN 702 and generating one or more communications for transmission over the local wireless network connections 134 and 135. As one example, the TX DNN 706 performs at least some transmitter chain operations associated with transmitting a first communication over the local wireless network connection 134 to the UE 112 and at least some transmitter chain operations associated with transmitting a second communication over the local wireless network connection 135 to the UE 113.

The non-coordinating UEs in the UECS 108 (e.g., UE 112, UE 113) each form a receive DNN, labeled receive DNN 708 (RX DNN 708) and receive DNN 710 (RX DNN 710), respectively, that operate as side-link RX DNNs for processing uplink UECS communications received from the coordinating UE over the local wireless network. The non-coordinating UEs also form respective transmit DNNs, labeled as transmit DNN 712 (TX DNN 712) and transmit DNN 714 (TX DNN 714), for transmitting the uplink UECS communications to the base station 602 over the wireless network using the wireless link 131. In aspects, the TX DNNs 712 and/or 714 apply timing adjustments to the uplink transmissions. Thus, similar to that described with reference to FIG. 6, the UEs in the UECS 108 form a first set of sub-DNNs 716 for processing communications transmitted over the wireless link 131 with the base station 120 and a second set of sub-DNNs 718 for processing communications transmitted over one or more side links (e.g., the local wireless network).

The base station 120 forms a receive DNN 720 (RX DNN 720) that receives at least some of the uplink transmissions from the various UEs of the UECS 108. In aspects, the RX DNN 720 combines and/or aggregates the uplink transmissions to extract the uplink user-plane data and/or control-plane information originated from the target UE.

The environment 700 generally denotes the functionality performed by the base station 120 as base station 722. While the example environment 700 shows a single base station (e.g., base station 120) performing the operations of the base station 722, alternate or additional implementations can utilize multiple base stations.

Figure 8:
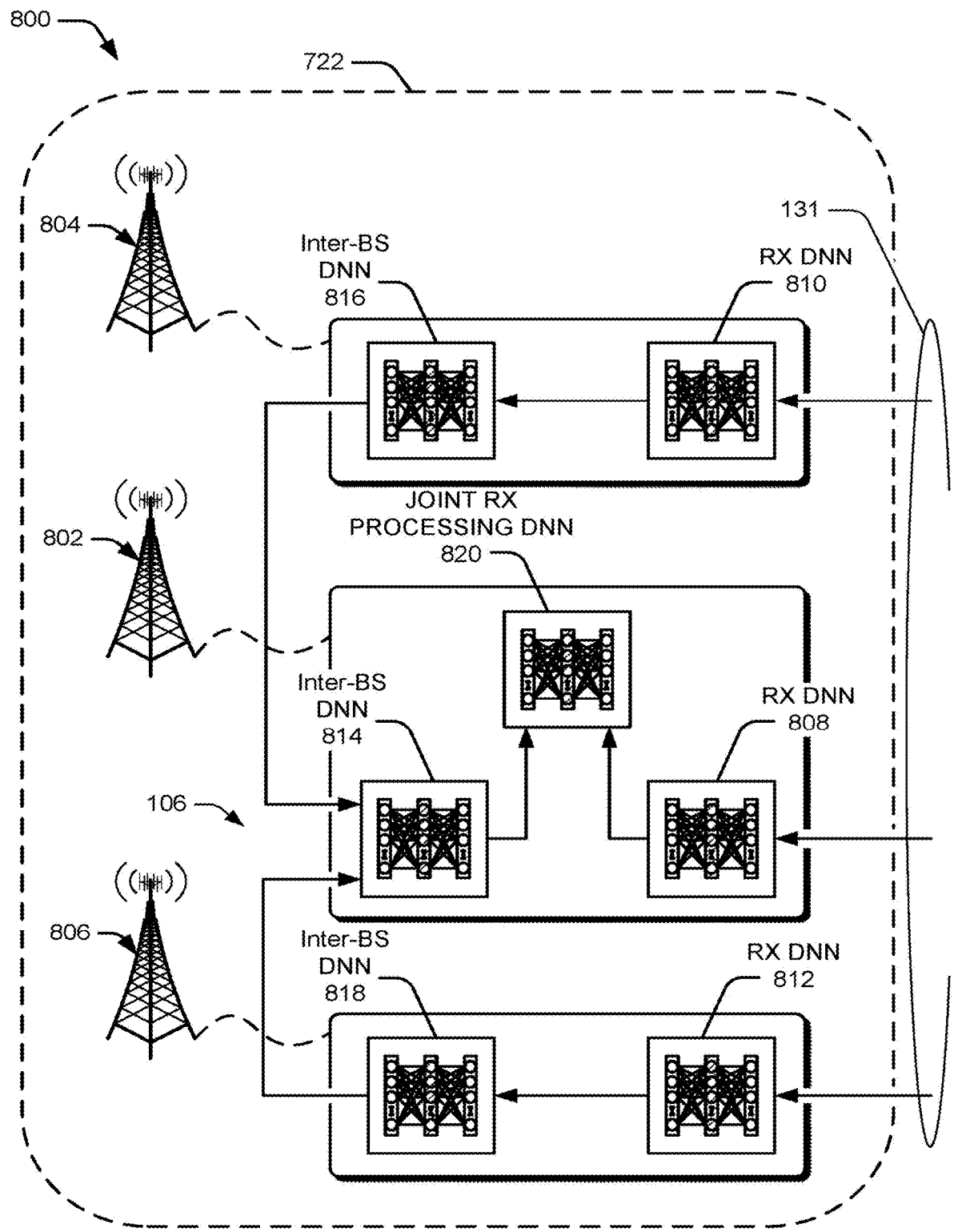
FIG. 8 illustrates an example operating environment in which DNN processing for a UECS can be implemented in accordance with various aspects.

FIG. 8 illustrates an example environment 800 in which DNN processing for a UECS can be implemented in accordance with various aspects. The environment 800 shows an example implementation of the base station 722 of FIG. 7 that includes multiple base stations: base station 802, base station 804, and base station 806 that each represent an instance of the base station 120 of FIG. 1. In aspects, the base station 802, the base station 804, and the base station 806 perform Coordinated Multipoint (CoMP) communication with a target UE and through the UECS. As one example, the base stations 802, 804, and 806 form an active coordination set (ACS) for joint communications (joint transmission, joint reception) with the UECS. In various implementations, an ACS may be a component of, or used to implement, a user-centric no-cell (UCNC) network architecture.

In some aspects, an E2E ML controller (e.g., E2E ML controller 274, E2E ML controller 318) determines an E2E ML configuration based on the UECS communicating with multiple base stations. In the environment 800, the E2E ML controller determines an E2E ML configuration that forms a single-directional E2E DNN for processing uplink UECS communications and directs each base station to form one or more sub-DNNs using portions of the E2E ML configuration. In other words, a portion of the E2E ML configuration forms a set of sub-DNNs distributed across multiple bases stations that perform CoMP communications with the UECS as illustrated in the environment 800. For example, the base stations 802, 804, and 806 each form a respective receive DNN (e.g., RX DNN 808, RX DNN 810, RX DNN 812) for receiving and processing communications transmitted over the wireless link 131. The base stations 802, 804, and 806 also form respective inter-base station DNNs for forwarding, or receiving, inter-base station communications. Assume in the environment 800 that the base station 802 acts as a master base station for the ACS formed by the base stations 802, 804, and 806. For uplink UECS communications, the base station 802 forms inter-base station DNN 814 (inter-BS DNN 814) for receiving and processing communications from the other base stations over the interface(s) 106. To send the communications through the interface(s) 106, the base stations 804 and 806 each form sub-DNNs, labeled as inter-base station DNN 816 (inter-B S DNN 816) and inter-base station DNN 818, respectively.

The base station 802, as the master base station for the ACS, forms a joint RX processing DNN 820 that aggregates the communications from the other base stations. As shown in the environment 800, the joint RX processing DNN 820 receives a first input associated with the uplink UECS communication from the RX DNN 808, and second and third inputs associated with the uplink UECS communication from the base stations 804 and 806 by way of the inter-BS DNN 814.

Using an E2E DNN for processing UECS communications in an E2E communication allows a network entity to dynamically determine and/or adjust an E2E ML configuration of the E2E DNN based on various factors and information, such as the ML capabilities of devices participating in the UECS, changes in devices participating in the UECS, signal and/or link quality indications, performance requirements, available wireless network resources, and so forth. In some aspects, the network entity determines a partitionable E2E ML configuration to distribute processing of the E2E DNN, such as by directing devices with less resources to form DNNs with less processing (e.g., less data, less memory, less CPU cycles, fewer nodes, fewer layers) relative to devices with more processing resources and/or memory. The dynamic adaptation and partitioning allows the network entity to modify the E2E DNN and improve the performance of E2E communications (e.g., higher resolution, faster processing, lower bit errors, improved signal quality, improved latency) based on the changing factors.

Adapting an E2E DNN for Processing UECS Communications

Figure 9:
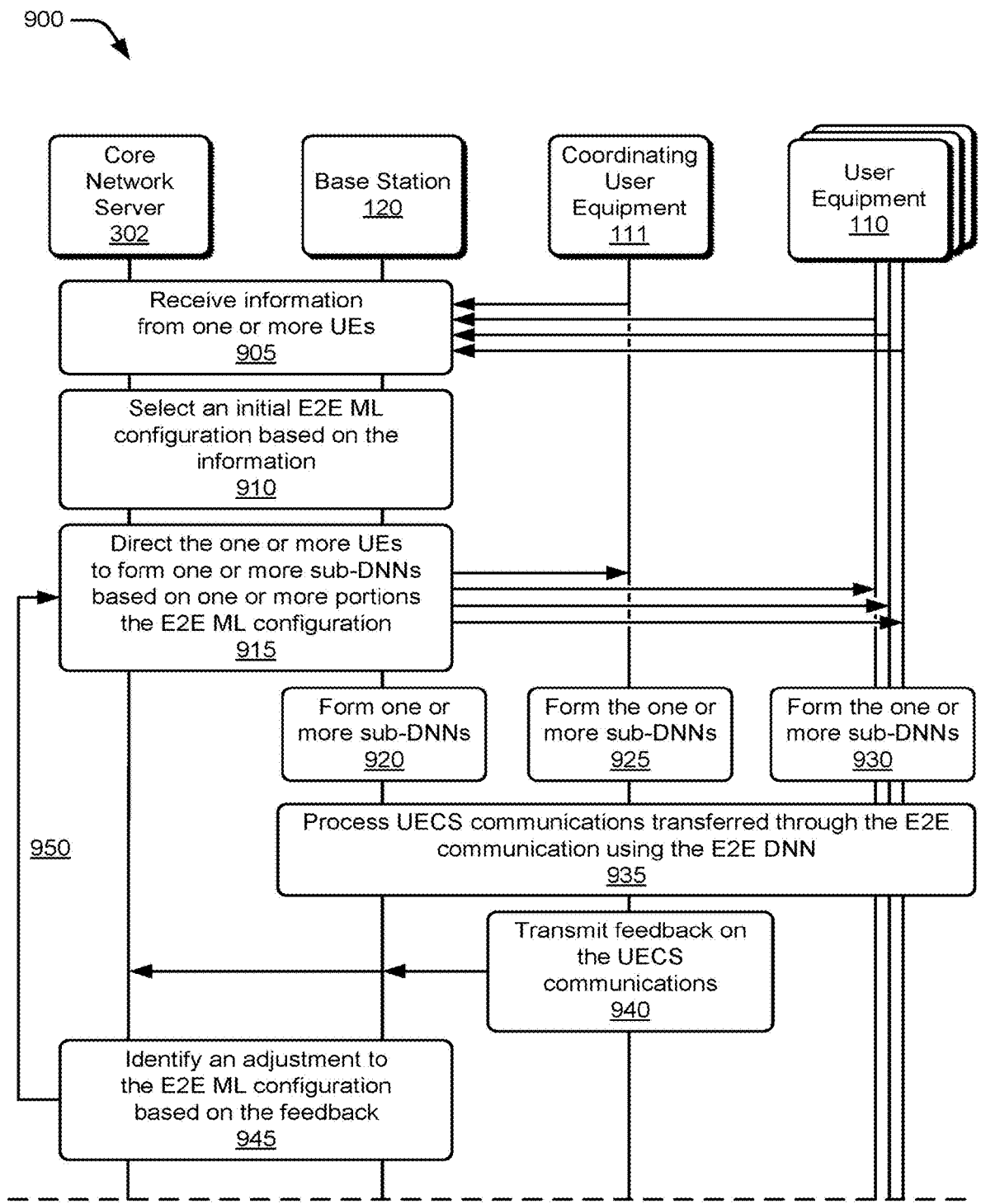
FIG. 9 illustrates an example transaction diagram between various network entities that implement DNN processing for a UECS.
Figure 10:
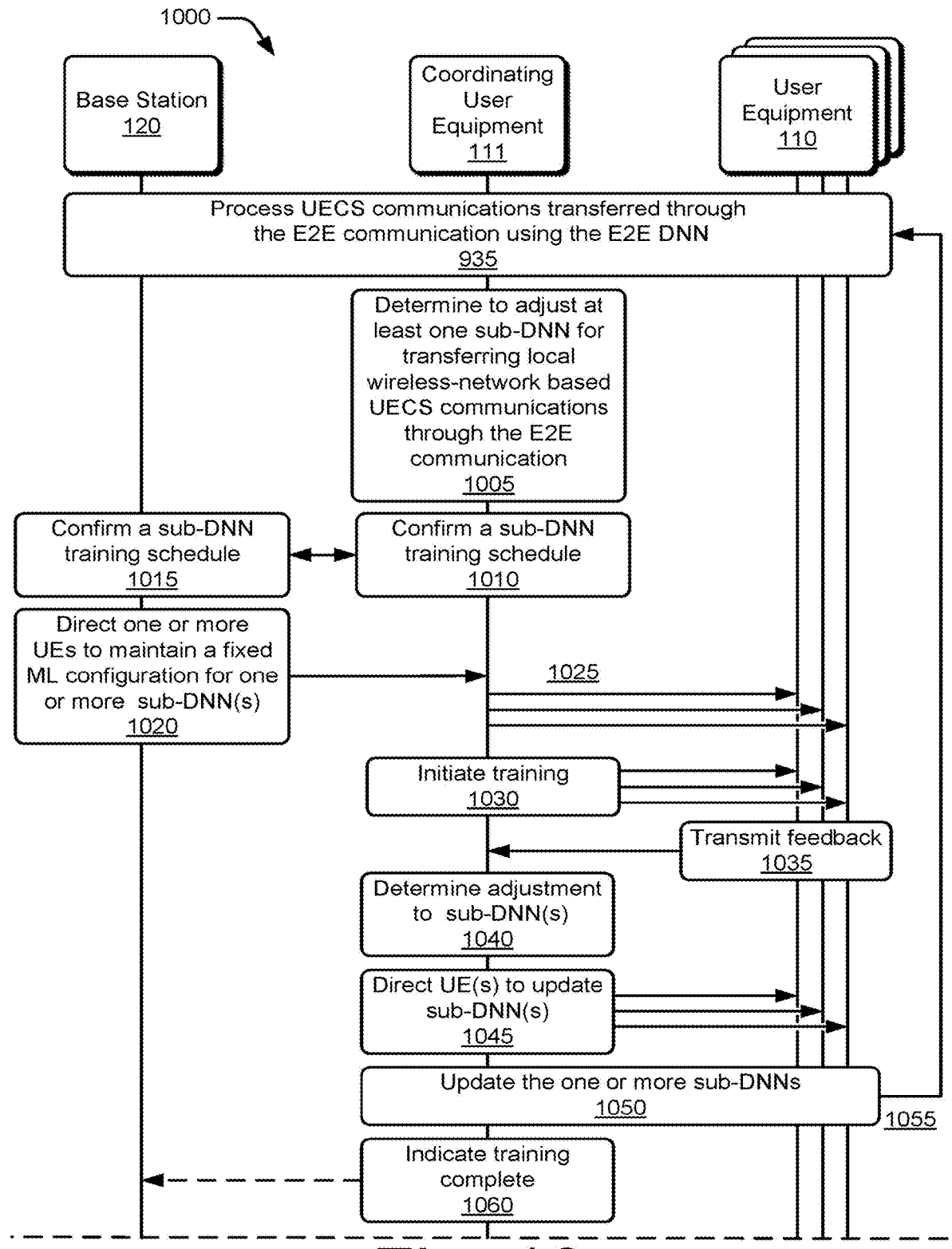
FIG. 10 illustrates other example transaction diagram between various network entities that implement DNN processing for a UECS.

FIGS. 9 and 10 illustrate example signaling and control transaction diagrams between a core network server, a base station, a coordinating user equipment, and at least one other user equipment in accordance with one or more aspects of DNN processing for a UECS (e.g., the UECS 108), such as aspects of adapting an E2E DNN for processing the UECS communications. Operations of the signaling and control transactions may be performed by the core network server 302 of FIG. 3 and/or the base station 120 of FIG. 1, the coordinating UE 111 and at least one other UE, generally indicated as UE 110 of FIG. 1, using aspects as described with reference to any of FIGS. 1-8.

A first example of signaling and control transactions for DNN processing for a UECS is illustrated by the signaling and control transaction diagram 900 of FIG. 9. In the diagram 900, a base station 120 and/or a core network server 302 select and adapt an E2E ML configuration that forms an E2E DNN for processing UECS communications.

As illustrated, at 905, the base station 120 and/or the core network server 302 receive information from one or more UEs participating in a UECS, such as the coordinating UE 111 and one or more UE 110. As one example, the base station 120 receives UE capabilities from the coordinating UE 111 and/or the one or more UE 110, such as in response to transmitting a UE capabilities enquiry message (not illustrated). At times, the coordinating UE 111 and/or the one or more UE 110 transmit an indication of ML capabilities (e.g., supported ML architectures, supported number of layers, available processing power, memory limitations, available power budget, fixed-point processing vs. floating point processing, maximum kernel size capability, computation capability). Alternatively, or additionally, the coordinating UE 111 and/or the one or more UE 110 transmit signal and/or link quality parameters, estimated UE-locations (e.g., an average estimated location of the UECS, an estimated location of each UE included in the UECS), a battery level, a temperature, and so forth. In some cases, the base station 120 forwards the UE capabilities, signal quality parameters, link quality parameters, and so forth, to the core network server 302.

At 910, the base station 120 and/or the core network server 302, by way of an E2E ML controller, select an initial E2E ML configuration based on the information received at 905. For instance, the base station 120 and/or the core network server 302 select an initial E2E ML configuration from a neural network table based on the UE and/or ML capabilities, a number of UEs participating in a UECS, an estimated location of the target UE and/or additional UEs in the UECS, signal quality, and so forth. In selecting the initial E2E ML configuration, the base station 120 and/or the core network server 302 sometimes determine partitions to the E2E ML configuration, such as partitions based on UE and/or ML capabilities.

In some aspects, the base station 120 and/or the core network server 302 select the initial E2E ML configuration based on one or more base stations participating in the E2E communications, such as the one or more base stations described with reference to FIG. 8. In some aspects, the selected E2E ML configuration corresponds to a single-directional E2E ML configuration that forms an E2E DNN for processing downlink UECS communications through an E2E communication as described with reference to FIG. 6 or for processing uplink UECS communications as described with reference to FIG. 7. Other times, the E2E ML configuration corresponds to a bidirectional E2E ML configuration that forms an E2E DNN for processing bidirectional UECS communications.

At 915, the base station 120 or the core network server 302 direct the one or more UEs to form one or more sub-DNNs based on one or more portions of the E2E ML configuration. For instance, the E2E ML controller 274 or 318 partitions the E2E ML configuration across multiple devices and determines a respective entry in the neural network table for each partition, where each entry indicates architecture and/or parameter configurations for a sub-DNN. The base station 120 then transmits indications of one or more indices into a neural network table (e.g., neural network table 216) to the coordinating UE 111 and/or the one or more UE 110, such as through transmissions over a control channel. For example, the base station 120 indicates the indices using layer 1 signaling and/or layer 2 messaging to the coordinating UE 111, and the coordinating UE 111 forwards the indices to the other UEs in the UECS using the local wireless network.

At 920, at 925, and at 930, the base station 120, the coordinating UE 111, and the one or more UE 110 form one or more respective sub-DNNs for processing UECS communications. To illustrate, the base station 120, the coordinating UE 111, and/or the one or more UE 110 accesses a respective neural network table to obtain one or more parameters and/or an architecture as described with reference to FIG. 5. In some cases, the base station 120 forms a TX DNN (e.g., TX DNN 602) for communicating downlink UECS communications to the coordinating UE 111 and the one or more UE 110, and/or an RX DNN (e.g., RX DNN 720) for receiving uplink UECS communications from the coordinating UE 111 and the one or more UE 110. At times, the base station 120 forms multiple sub-DNNs, such as sub-DNNs for inter-BS communications (e.g., inter-BS DNN 814, inter-BS DNN 816, inter-BS DNN 818) and/or for processing CoMP communications (e.g., joint RX processing DNN 820).

The coordinating UE 111 forms at least a first sub-DNN (e.g., RX DNN 604, TX DNN 704) for processing wireless network communications with the base station, at least a second sub-DNN (e.g., RX DNN 618, TX DNN 706) for processing local wireless network communications with other UEs, and at least a third sub-DNN for joint processing (e.g., joint RX processing DNN 620, joint TX processing DNN 702). The one or more UE 110, acting as participant UE(s) in the UECS, forms at least a first sub-DNN (e.g., RX DNN 606, RX DNN 608, TX DNN 712, TX DNN 714) for processing wireless network communications with the base station, at least a second sub-DNN (e.g., TX DNN 614, TX DNN 616, RX DNN 708, RX DNN 710) for processing local wireless network communications with a coordinating UE.

At 935, the base station 120, the coordinating UE 111, and/or the one or more UE 110 process UECS communications transferred through the E2E communication using the E2E DNN formed from the E2E ML configuration selected at 910. For example, with reference to FIGS. 6-8, the E2E DNN (by way of the sub-DNNs) processes uplink and/or downlink UECS communications.

At 940, the coordinating UE 111 transmits feedback on the UECS communications to the base station 120 and/or the core network server 302 (through the base station 120). For instance, the coordinating UE 111 transmits signal and/or link quality parameters (e.g., RSSI, power information, SINR, RSRP, CQI, CSI, Doppler feedback, BLER, HARQ, timing measurements, error metrics, etc.) to the base station 120. As another example, the coordinating UE 111 transmits UE capabilities and/or ML capabilities.

At 945, the base station 120 and/or the core network server 302 (by way of an E2E ML controller) identify an adjustment to the E2E ML configuration based on the feedback. The identified adjustment can include any combination of architectural changes and/or parameter changes to the E2E ML configuration as further described, such as a small change that involves updating parameters and/or a large change that reconfigures node and/or layer connections of the E2E DNN. For example, based on the feedback received at 940, the base station 120 determines to add and/or remove UEs from the UECS and determines the adjustment based on a change in participating UEs of the UECS. As another example, the base station 120 determines to change the coordinating UE from the coordinating UE 111 to another UE and determines the adjustment based on the change in coordinating UEs. Alternatively, or additionally, the base station 120 determines an adjustment based on a channel impairment identified by the feedback.

In response to identifying the adjustment, the diagram progresses at 950, and base station 120 and/or the core network server 302 direct the one or more UEs to form one or more sub-DNNs based on one or more portions of the adjusted E2E ML configuration at 915. This allows the network entity to dynamically adapt the E2E DNN, and how the E2E DNN processes UECS communications, to optimize (and re-optimize) the processing as the operating environment changes (e.g., changing channel conditions, change in participating UEs, change in a coordinating UE).

A second example of signaling and control transactions for DNN processing for a UECS is illustrated by the signaling and control transaction diagram 1000 of FIG. 10. In the diagram 1000, a coordinating UE adapts a portion of E2E ML configuration for processing UECS communications. In some aspects, the signaling and control transactions shown in the diagram 1000 operate as a continuation of, or in conjunction with, the signaling and control transactions shown in the diagram 900.

As illustrated, the diagram 1000 begins at 935 of FIG. 9, where the base station 120, the coordinating UE 111, and the one or more UE 110 process UECS communications transferred through the E2E communication using a partitioned E2E DNN. At 1005, the coordinating UE 111 determines to adjust at least one sub-DNN for transferring local-wireless-network-based UECS communications through the E2E communication. For example, the UEs 111, 112, and 113 form sub-DNNs directed to communications exchanged between one another using the local wireless network connections 134 and/or 135 as described at 925 and at 930 of FIG. 9. Alternatively, or additionally, the coordinating UE 111 determines to adjust a joint processing DNN, such as the joint RX processing DNN 620 and/or the joint TX processing DNN 702. To illustrate, in response to identifying that a packet error rate of at least one of the participating UEs has exceeded an acceptable performance threshold, the coordinating UE 111 determines to adjust at least one sub-DNN used to process the local-wireless-network-based UECS communications. Other times, the UE 111 determines to adjust at least one sub-DNN on a periodic basis.

At 1010 and at 1015, the coordinating UE 111 and the base station 120 confirm a sub-DNN training schedule. In some aspects, the coordinating UE 111 requests a training schedule from the base station 120 and the base station 120 confirms a start time and/or time duration for the sub-DNN training to the coordinating UE 111. Alternatively, or additionally, the coordinating UE 111 indicates a proposed training schedule to the base station 120 and the base station 120 confirms the proposed training schedule and/or provides an alternative training schedule to the coordinating UE 111.

At 1020, the base station 120 directs one or more UEs included in the UECS to maintain a fixed architecture ML configuration for one or more sub-DNNs. For instance, the base station 120 directs the one or more UEs to maintain a fixed ML configuration (e.g., architecture and/or parameters) for one or more sub-DNNs used to process wireless-network based UECS communications (e.g., RX DNN 604, RX DNN 606, RX DNN 608, TX DNN 704, TX DNN 7'2, TX DNN 714) with the base station 120. The base station 120 can explicitly direct the one or more UEs to maintain a fixed ML configuration, as show at 1020, or implicitly direct the one or more UEs to maintain a fixed ML configuration by confirming the training schedule at 1015. In some aspects, the base station explicitly directs the coordinating UE 111 to maintain the fixed ML architecture, and the coordinating UE 111 forwards the direction to maintain the fixed ML architecture to the one or more UE 110 at 1025. However, at other times, the base station 120 explicitly (and separately) directs each UE in the UECS to maintain the fixed ML architecture. Alternatively, or additionally, the base station 120 refrains from transmitting E2E ML configuration adjustments to the coordinating UE 111 and/or the one or more UE 110 based on the confirmed training schedule.

At 1030, the coordinating UE 111 initiates a training procedure with the one or more UE 110, such as a training procedure that measures reference signals transmitted over the local wireless network connections 134 and 135. Alternatively, or additionally, the coordinating UE 111 requests the one or more UE 110 to forward signal and/or link quality parameters associated with the local wireless network connections, such as by sending a request message to each of the one or more UE 110 over the respective local wireless network connections or by broadcasting the request message over the local wireless network. For instance, the coordinating UE 111 requests the one or more UE 110 to forward RSSI, Link Quality (LQ), transmitted power link (TPL), and/or receive power (RX) parameters based on the local wireless network connection(s). In some aspects, the coordinating UE 111 requests estimated distance and/or location information from each of the one or more UE 110. Accordingly, at 1035, the one or more UE 110 forward feedback to the coordinating UE 111 over the local wireless network.

At 1040, the coordinating UE 111 determines an adjustment to at least one sub-DNN associated with the local wireless network. For example, similar to that described at 945 of FIG. 9, the coordinating UE 111 determines architectural changes and/or parameter changes to one or more sub-DNNs associated with the local wireless network, such as a small change that involves updating parameters and/or a large change that reconfigures node and/or layer connections of one or more sub-DNNs. In aspects, the coordinating UE 111 analyzes a neural network table based on the feedback received at 1035 and identifies adjustments from the neural network table. As another example, the coordinating UE 111 forwards the feedback to the base station 120, such as that described at 940 of FIG. 9, and requests an adjustment from the base station 120.

At 1045, the coordinating UE 111 directs one or more UEs 110 to update the one or more sub-DNNs for transferring the local-wireless-network-based UECS communications through the E2E communication, such as by transmitting indices into a neural network table over a local wireless network connection. Alternatively, or additionally, the base station 120 directs the UEs to update the sub-DNNs (not illustrated) using similar techniques as described at 915 of FIG. 9. In response to receiving the direction at 1045 (e.g., from the coordinating UE 111 or the base station 120), the coordinating UE 111 and/or the one or more UE 110 update the one or more sub-DNNs at 1050, and at 1055, the base station 120, the coordinating UE 111 and the one or more UE 110 process UECS communications transferred through the E2E communication using the updated E2E DNN as described at 935. This allows the coordinating UE 111 and/or the base station 120 to dynamically adapt a portion of the E2E DNN that processes local-wireless-network-based UECS communications, to optimize (and re-optimize) the processing as the operating environment changes (e.g., changing channel conditions, change in participating UEs, change in a coordinating UE). Optionally, at 1060, the coordinating UE 111 indicates, to the base station 120, that the training has completed.

Example Methods

Example methods 1100 and 1200 are described with reference to FIG. 11 and FIG. 12 in accordance with one or more aspects of DNN processing for a UECS.

Figure 11:
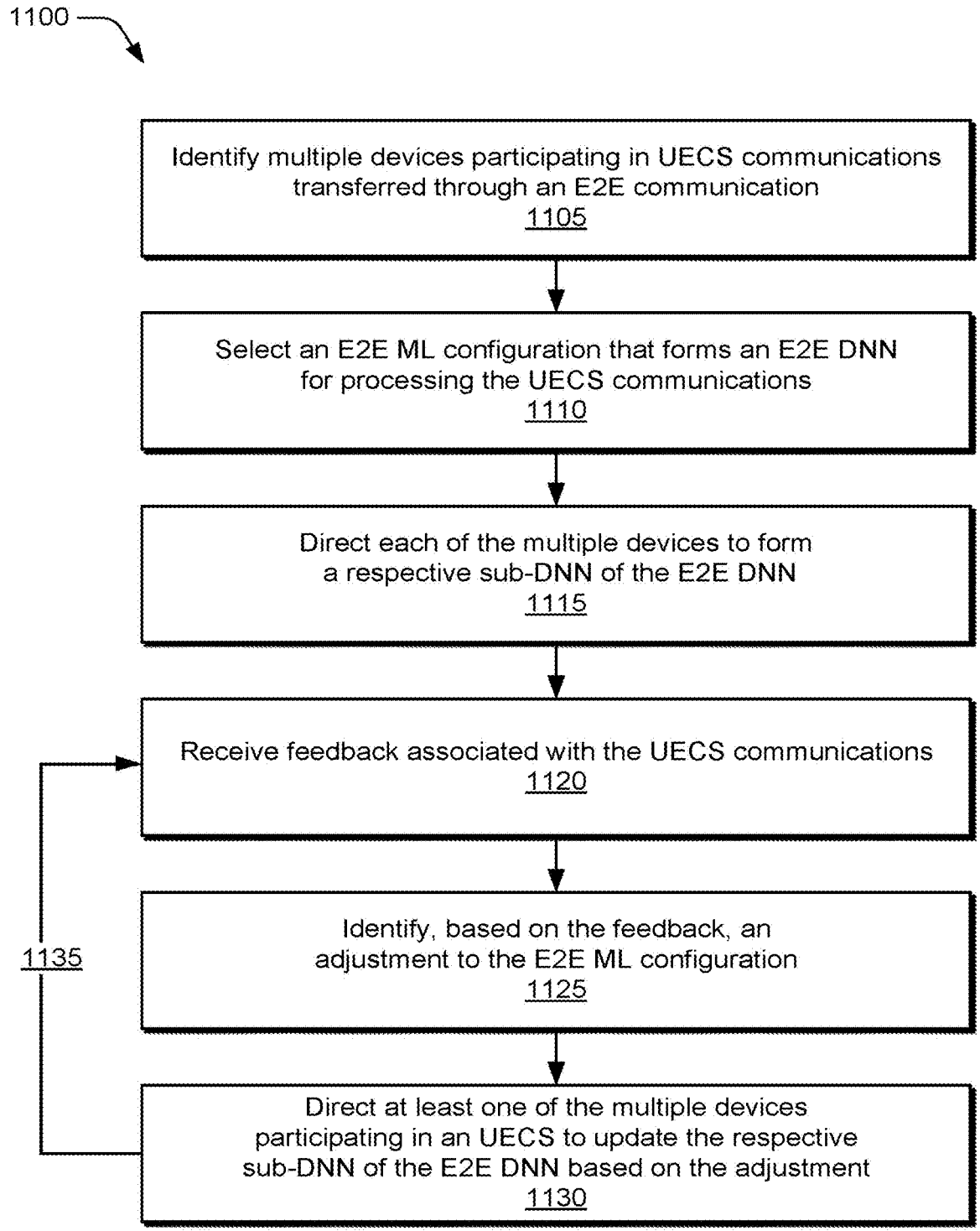
FIG. 11 illustrates an example method for DNN processing for a UECS.

FIG. 11 illustrates an example method 1100 used to perform aspects of DNN processing for a UECS. In some implementations, operations of the method 1100 are performed by a network entity, such as the base station 120 and/or the core network server 302.

At 1105, a network entity identifies multiple devices participating in UECS communications transferred through an E2E communication. For example, the base station 120 identifies the UE 111, the UE 112, and the UE 113 as UEs to include in a UECS. Alternatively, or additionally, the base station 120 identifies and directs the UE 111 to act as a coordinating UE of the UECS. In aspects, the multiple devices participating in the UECS communications transferred through the E2E communication include at least one base station, a coordinating user equipment (UE) and at least one additional UE as described with reference to FIGS. 6-8.

At 1110, the network entity selects an E2E ML configuration that forms an E2E DNN for processing the UECS communications. For instance, the core network server 302 or the base station 120 select, by way of an E2E ML controller, the E2E ML configuration as described at 910 of FIG. 9. In some aspects, the core network server and/or the base station 120 receive information from one or more UEs (e.g., UE 111, UE 112, UE 113) forming the UECS, such as ML capabilities and/or signal and/or link quality parameters as described at 905 of FIG. 9. This can include selecting an E2E ML configuration for single-directional UECS communications (e.g., downlink only, uplink only) or bidirectional UECS communications as describe with reference to FIGS. 6-8.

At 1115, the network entity directs each device of multiple devices participating in an UECS to form, using at least a portion of the E2E ML configuration, a respective sub-DNN of the E2E DNN that transfers the UECS communications through the E2E communication. For example, the core network server 302 or the base station 120 direct the UE 111, the UE 112, and/or the UE 113 to form multiple sub-DNNs as described at 925 and at 930 of FIG. 9. Alternatively, or additionally, the core network server 302 and/or another base station directs the base station 120 to form one or more sub-DNNs as described at 920 of FIG. 9.

At 1120, the network entity receives, from at least one of the multiple devices, feedback associated with the UECS communications. To illustrate, the base station 120 receives signal and/or link quality parameters from the UE 111 as described at 940 of FIG. 9. Alternatively, or additionally, the core network server 302 receives the signal and/or link quality parameters from the base station 120.

At 1125, the network entity identifies, based on the feedback, an adjustment to the E2E ML configuration. For example, the core network server or the base station 120 analyze a neural network table (e.g., neural network table 316, neural network table 272) based on the feedback and identify an adjustment to the E2E ML configuration, such as an architectural adjustment and/or parameter changes.

At 1130, the network entity directs at least one of the multiple devices participating in an UECS to update the respective sub-DNN of the E2E DNN based on the adjustment. To illustrate, the base station 120 transmits an indication of the adjustment to the UE 111, UE 112, and/or the UE 113 using a control channel as described at 915 of FIG. 9, such as by transmitting an indication of an index into the neural network table using layer 1 signaling and/or layer 2 messaging.

In some aspects, the method 1100 iteratively repeats as indicated at 1135, such as when the network entity receives new feedback and/or information as described at 1120, where the feedback and/or information indicates to change the E2E ML configuration for the E2E DNN. This allows the network entity to dynamically adapt DNNs, and how the DNNs process E2E communications, to optimize (and re-optimize) the processing as UECS communications change.

Figure 12:
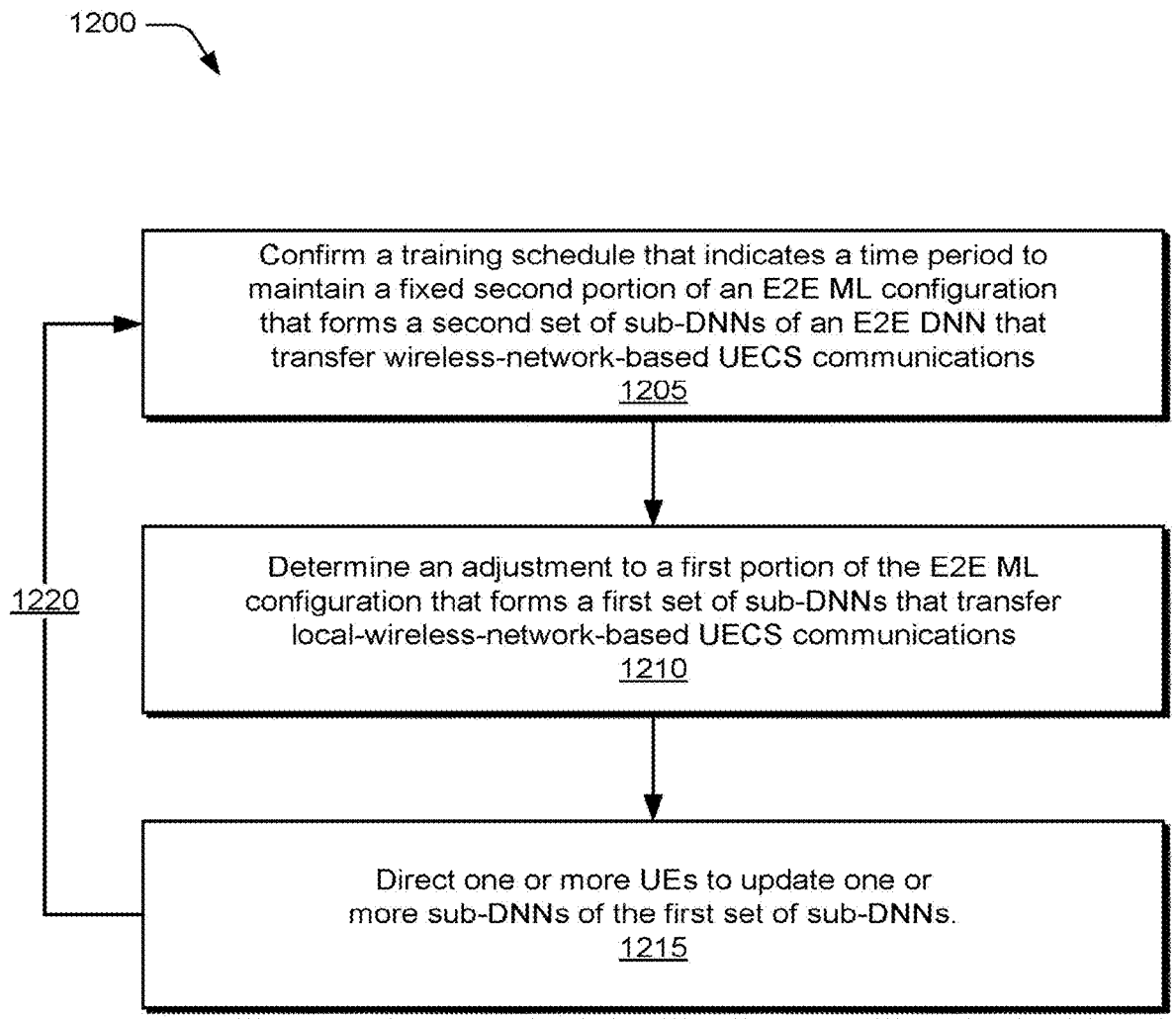
FIG. 12 illustrates another example method for DNN processing for a UECS.

FIG. 12 illustrates an example method 1200 used to perform aspects of DNN processing for a UECS. In some implementations, operations of the method 1200 are performed by a coordinating user equipment of a UECS, such as UE 111.

At 1205, the UE confirms, with a network entity, a training schedule that indicates a time period to maintain a fixed second portion of the E2E ML configuration that forms a second set of sub-DNNs (e.g., the set of sub-DNNs 610, the set of sub-DNNs 716), of the E2E DNN, that transfer wireless-network-based UECS communications through the E2E communication. For example, the coordinating UE 111 confirms the training schedule with the base station 120 as described at 1010 and at 1020 of FIG. 10.

At 1210, the UE determines, based on the training schedule, an adjustment to the first portion of the E2E ML configuration that forms the first set of sub-DNNs (e.g., the set of sub-DNNs 612, the set of sub-DNNs 718) that transfer the local-wireless-network-based UECS communications through the E2E communication. For example, the coordinating UE 111 determines the adjustment as described at 1040 by initiating a training procedure and analyzing a neural network table. Alternatively or additionally, the coordinating UE 111 initiates the training procedure and forwards signal and/or link quality metrics to the base station 120 similar to that described at 940 of FIG. 9, and receives the adjustment from the base station similar to that described at 915 of FIG. 9.

At 1215, the UE directs one or more additional UEs participating in the UECS to update one or more sub-DNNs of the first set of sub-DNNs using the adjustment to the first portion of the E2E ML configuration. For example, the coordinating UE 111 directs one or more UEs participating in the UECS (e.g., UE 112, UE 113) to update one or more sub-DNNs as described at 1050 of FIG. 10.

In some aspects, the method 1200 iteratively repeats as indicated at 1220. For instance, the coordinating UE 111 determines to adjust the sub-DNNs based on a signal and/or link quality parameter failing to meet an acceptable performance threshold or based on a periodic schedule that indicates when to evaluate and/or adjust the sub-DNNs. This iterative process allows the network entity to dynamically adapt DNNs, and how the DNNs process UECS communications, to optimize (and re-optimize) the processing as conditions change.

The order in which the method blocks of the method 1100 and the method 1200 are described are not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

In the following, several examples are described:

Example 1: A method performed by a network entity for determining an end-to-end (E2E) machine-learning (ML) configuration that forms an E2E deep neural network (DNN) for processing user equipment-coordinated set (UECS) communications transferred through an E2E communication in a wireless network, the method comprising: selecting, by the network entity, the E2E ML configuration that forms the E2E DNN for processing the UECS communications; directing each device of multiple devices participating in an UECS to form, using at least a portion of the E2E ML configuration, a respective sub-DNN of the E2E DNN that transfers the UECS communications through the E2E communication, the multiple devices including at least one base station, a coordinating user equipment (UE), and at least one additional UE; receiving, from at least one of the multiple devices, feedback associated with the UECS communications; identifying, based on the feedback, an adjustment to the E2E ML configuration; and directing at least one of the multiple devices participating in an UECS to update its respective sub-DNN of the E2E DNN based on the adjustment.

Example 2: The method as recited in example 1, wherein the feedback comprises one or more of: a received signal strength indicator (RSSI), power information, signal-to-interference-plus-noise ratio (SINR) information, reference signal receive power (RSRP), channel quality indicator (CQI) information, channel state information (CSI), Doppler feedback, BLock Error Rate (BLER), Quality of Service (QoS), Hybrid Automatic Repeat reQuest (HARD) information, uplink SINR, timing measurements, error metrics, UE capabilities, or ML capabilities.

Example 3: The method as recited in example 1, wherein directing each device of multiple devices to form a respective sub-DNN of the E2E DNN further comprises: directing the at least one base station to form a first sub-DNN of the E2E DNN that processes downlink UECS communications to the UECS over the wireless network; directing the coordinating UE to form a second sub-DNN of the E2E DNN that processes the downlink UECS communications received from the at least one base station over the wireless network and a third sub-DNN of the E2E DNN that processes a local wireless network communication from the at least one additional UE received over a local wireless network; and directing the at least one additional UE to form a fourth sub-DNN that processes downlink UECS communications received from the at least one base station over the wireless network and a fifth sub-DNN that processes input from the fourth sub-DNN and generates the local wireless network communication transmitted to the coordinating UE.

Example 4: The method as recited in the example 3, wherein directing each device of multiple devices to form a respective sub-DNN of the E2E DNN further comprises: directing the coordinating UE to form a sixth sub-DNN that jointly processes the local wireless network communication from the at least one additional UE and the downlink UECS communications received from the at least one base station over the wireless network.

Example 5: The method as recited in the example 3, wherein the fifth sub-DNN receives, from the fourth sub-DNN, In-phase and Quadrature (IQ) samples of a wireless signal carrying the downlink UECS communications from the at least one base station over the wireless network, and forwards the IQ samples to the coordinating UE using the local wireless network communication.

Example 6: The method as recited in the example 1, wherein selecting the E2E ML configuration that forms the E2E DNN for processing the UECS communications further comprises: receiving, from at least one of the multiple devices, device capabilities; and determining the E2E ML configuration based on device capabilities.

Example 7: The method as recited in the example 6, wherein the device capabilities comprise one or more of: supported ML architectures, supported number of layers, available processing power, memory limitations, available power budget, fixed-point processing vs. floating point processing, maximum kernel size capability, computation capability, a battery level, a temperature, or an estimated UE-location.

Example 8: The method as recited in the example 1, wherein identifying the adjustment to the E2E ML configuration further comprises: determining, based on the feedback, to remove at least one UE participating in the UECS; and identifying the adjustment based on the determining to remove the at least one UE participating in the UECS.

Example 9: The method as recited in the example 1, wherein directing each device of multiple devices to form a respective sub-DNN of the E2E DNN further comprises: indicating, to each of the multiple devices, at least the portion of the E2E ML configuration by indicating at least one of: a ML architecture to use for the respective sub-DNN; or one or more ML parameters to use for the respective sub-DNN. Examples of ML architectures include a number of layers, layer down-sampling configurations, adding or removing fully convolutional layers, adding or removing a recurrent neural network layer, interconnections between neural network layers, a number and/or configuration of hidden layers, a number of nodes, pooling configurations, an input layer architecture, and an output layer architecture. Examples of ML parameters include coefficients, weights, kernel parameters, and biases Example 10: The method as recited in the example 9, wherein indicating at least the portion of the E2E ML configuration further comprises: transmitting, to at least the one of the multiple devices, an indication to update at least the portion of the E2E ML configuration over a control channel.

Example 11: The method as recited in the example 9, wherein indicating at least the portion of the E2E ML configuration further comprises: indicating, to a first additional UE of the at least one additional UE, a first ML architecture based on one or more ML capabilities of the first additional UE; and indicating, to a second additional UE of the at least one additional UE, a second ML architecture based on one or more ML capabilities of the second additional UE, the second ML architecture being different from the first ML architecture.

Example 12: The method as recited in the example 1, wherein selecting the E2E ML configuration that forms the E2E DNN for processing the UECS communications further comprises: selecting the E2E ML configuration to form the E2E DNN for processing uplink UECS communications.

Example 13: A network entity comprising: at least one processor; and computer-readable storage media comprising instructions that, responsive to execution by the at least one processor, direct the network entity to perform a method for determining an end-to-end (E2E) machine-learning (ML) configuration that forms an E2E deep neural network (DNN) for processing user equipment-coordinated set (UECS) communications transferred through an E2E communication in a wireless network, the method comprising: identifying, by the network entity, multiple devices participating in the UECS communications transferred through the E2E communication, the multiple devices including at least one base station, a coordinating user equipment (UE) and at least one additional UE, the coordinating UE and the at least one additional UE forming a UECS; selecting, based on the multiple devices, the E2E ML configuration that forms the E2E DNN for processing the UECS communications; and directing each of the multiple devices to form, using at least a portion of the E2E ML configuration, at least a portion of the E2E DNN that transfers the UECS communications through the E2E communication.

Example 14: The network entity as recited in the example 13, wherein the computer-readable storage media comprises further instructions that, responsive to execution by the at least one processor, direct the network entity to perform directing each of the multiple devices to form at least the portion of the E2E DNN by: directing the at least one base station to form a first sub-DNN of the E2E DNN that processes downlink communications for transmission to the UECS over the wireless network; directing the coordinating UE to form a second sub-DNN of the E2E DNN that processes downlink UECS communications received from the at least one base station over the wireless network; and directing the at least one additional UE to form a third sub-DNN that processes downlink UECS communications received from the at least one base station over the wireless network.

Example 15: The network entity as recited in the example 14, wherein the computer-readable storage media comprises further instructions that, responsive to execution by the at least one processor, direct the network entity to perform directing each of the multiple devices to form at least the portion of the E2E DNN by: directing the at least one additional UE to form a fourth sub-DNN that processes input from the third sub-DNN and transmits a local wireless network communication to the coordinating UE; directing the coordinating UE to form a fifth sub-DNN that processes the local wireless network communication received from the at least one additional UE; and directing the coordinating UE to form a sixth sub-DNN that jointly processes the local wireless network communication from the at least one additional UE and the downlink UECS communications received from the at least one base station over the wireless network.

Example 16: The network entity as recited in the example 15, wherein the fourth sub-DNN receives, from the third sub-DNN, In-phase and Quadrature (IQ) samples of a wireless signal carrying the downlink UECS communications from the at least one base station over the wireless network, and sends the IQ samples to the coordinating UE using the local wireless network communication.

Example 17: The network entity as recited in the example 13, wherein the computer-readable storage media comprises further instructions that, responsive to execution by the at least one processor, direct the network entity to perform selecting the E2E ML configuration that forms the E2E DNN for processing the UECS communications by: selecting the E2E ML configuration to form the E2E DNN for processing uplink UECS communications.

Example 18: The network entity as recited in the example 17, wherein the at least one base station comprises multiple base stations configured for Coordinated Multipoint (CoMP) communication with the UECS, and wherein the computer-readable storage media comprises further instructions that, responsive to execution by the at least one processor, direct the network entity to perform selecting the E2E ML configuration that forms the E2E DNN for processing the uplink UECS communications by: selecting the E2E ML configuration to form, using a first portion of the E2E ML configuration, a set of sub-DNNs distributed across the multiple base stations.

Example 19: The network entity as recited in the example 18, wherein the computer-readable storage media comprises further instructions that, responsive to execution by the at least one processor, direct the network entity to perform directing each of the multiple devices to form a respective sub-DNN by: directing a master base station of the multiple base stations to form: a receive sub-DNN (RX sub-DNN) that processes at least a portion of the uplink UECS communications received by the master base station over the wireless network and generates a first output; an inter-base station sub-DNN (inter-BS sub-DNN) that receives and processes input from a first base station of the multiple base stations and generates a second output;

and a joint receive processing sub-DNN (joint RX processing sub-DNN) that jointly processes the first output and the second output to recover the uplink UECS communications.

Example 20: The network entity as recited in the example 13, wherein the computer-readable storage media comprises instructions that, responsive to execution by the at least one processor, direct the network entity to perform, as part of the method, operations comprising: receiving feedback from at least one of the multiple devices; determining an adjustment to the E2E ML configuration based on the feedback; indicating, the adjustment to the E2E ML configuration to at least the one of the multiple devices; and directing at least the one of the multiple devices to update its respective sub-DNN using the adjustment.

Example 21: A method performed by a coordinating user equipment (UE) in a user equipment-coordinated set (UECS) for determining at least a first portion of an end-to-end (E2E) machine-learning (ML) configuration that forms a first set of sub-deep neural networks (sub-DNNs), of an E2E DNN, that transfer local-wireless-network-based UECS communications through an E2E communication, the method comprising: confirming, with a network entity, a training schedule that indicates a time period to fixedly maintain a second portion of the E2E ML configuration that forms a second set of sub-DNNs, of the E2E DNN, that transfer cellular-network-based UECS communications through the E2E communication; determining, based on the training schedule, an adjustment to the first portion of the E2E ML configuration; and directing one or more additional UEs participating in the UECS to update one or more sub-DNNs of the first set of sub-DNNs using the adjustment to the first portion of the E2E ML configuration.

Example 22: The method as recited in the example 21, wherein determining the adjustment comprises determining at least one of: one or more parameter updates to at least a portion of the E2E ML configuration; or one or more ML architecture changes to at least the portion of the E2E ML configuration.

Example 23: The method as recited in the example 21, wherein directing the one or more additional UEs participating in the UECS to update one or more sub-DNNs of the first set of sub-DNNs using the adjustment to the first portion of the E2E ML configuration further comprises: directing a first additional UE of the one or more additional UEs to update a first sub-DNN, of the first set of sub-DNNs, that generates a local wireless network communication directed to the coordinating UE; or directing the first additional UE to update a second sub-DNN, of the first set of sub-DNNs, that receives a local wireless network communication from the coordinating UE.

Example 24: The method as recited in the example 21, wherein determining the adjustment to the first portion of the E2E ML configuration further comprises: determining an adjustment to the first portion of the E2E ML configuration that forms a joint processing DNN at the coordinating UE.

Although techniques and devices for DNN processing for a UECS have been described in language specific to features and/or methods, it is to be understood that the subject of the appended claims is not necessarily limited to the specific features or methods described. Rather, the specific features and methods are disclosed as example implementations of DNN processing for a UECS.

What is claimed is:
1. A network entity comprising:
at least one processor; and
computer-readable storage media comprising instructions that, responsive to execution by the at least one processor, cause the at least one processor to:
identify, multiple devices participating in a user equipment coordinated set (UECS) communications transferred through an end-to-end (E2E) communication, the multiple devices including at least one base station, a coordinating user equipment (UE) and at least one additional UE, the coordinating UE and the at least one additional UE forming the UECS;
select, based on the multiple devices, an E2E machine learning (ML) configuration that forms an E2E deep neural network (DNN) for processing the UECS communications;
confirm, with the coordinating UE, a training schedule to fixedly maintain at least a first portion of the E2E ML configuration that forms a first set of sub-DNNs of the E2E DNN; and
direct each of the multiple devices to form, using the at least the first portion of the E2E ML configuration, a respective sub-DNN of the E2E DNN that transfers the UECS communications through the E2E communication in a wireless network.

2. The network entity of claim 1, wherein to direct each of the multiple devices to form the respective sub-DNN of the E2E DNN, the at least one processor is further to:
direct the at least one base station to form a first sub-DNN of the E2E DNN that processes downlink communications for transmission to the UECS over the wireless network;
direct the coordinating UE to form a second sub-DNN of the E2E DNN that processes downlink UECS communications received from the at least one base station over the wireless network; and
direct the at least one additional UE to form a third sub-DNN that processes downlink UECS communications received from the at least one base station over the wireless network.

3. The network entity of claim 2, wherein to direct each of the multiple devices to form the respective sub-DNN of the E2E DNN, the at least one processor is further to:
direct the at least one additional UE to form a fourth sub-DNN that processes input from the third sub-DNN and transmits a local wireless network communication to the coordinating UE;
direct the coordinating UE to form a fifth sub-DNN that processes the local wireless network communication received from the at least one additional UE; and
direct the coordinating UE to form a sixth sub-DNN that processes an output from the fifth sub-DNN and an output from the second sub-DNN.

4. The network entity of claim 3, wherein the fourth sub-DNN receives, from the third sub-DNN, In-phase and Quadrature (IQ) samples of a wireless signal carrying the downlink UECS communications from the at least one base station over the wireless network, and sends the IQ samples to the coordinating UE using the local wireless network communication.

5. The network entity of claim 1, wherein to select the E2E ML configuration that forms the E2E DNN for processing the UECS communications, the at least one processor is further to:
select the E2E ML configuration to form the E2E DNN for processing uplink UECS communications.

6. The network entity of claim 5, wherein the at least one base station comprises multiple base stations configured for Coordinated Multipoint (CoMP) communication with the UECS, and
wherein to select the E2E ML configuration to form the E2E DNN for processing the uplink UECS communications, the at least one processor is further to:
select the E2E ML configuration to form, using a first portion of the E2E ML configuration, a set of sub-DNNs distributed across the multiple base stations.

7. The network entity of claim 6, wherein to direct each of the multiple devices to form the respective sub-DNN, the at least one processor is further to direct a master base station of the multiple base stations to form a receive sub-DNN (RX sub-DNN) that processes at least a portion of the uplink UECS communications received by the master base station over the wireless network and generates a first output, and further comprising:
an inter-base station sub-DNN (inter-BS sub-DNN) that receives and processes input from a first base station of the multiple base stations and generates a second output; and
a joint receive processing sub-DNN (joint RX processing sub-DNN) that jointly processes the first output and the second output to recover the uplink UECS communications.

8. The network entity of claim 1, wherein the at least one processor is further to:
receive feedback from at least a first of the multiple devices;
determine an adjustment to the E2E ML configuration based on the feedback;
indicate, the adjustment to the E2E ML configuration to at least a second of the multiple devices; and
direct at least the second of the multiple devices to update its respective sub-DNN using the adjustment, wherein the first and the second of the multiple devices are the same.

9. The network entity of claim 1,
wherein the training schedule indicates a time period to fixedly maintain a second portion of the E2E ML configuration that forms a second set of sub-DNNs of the E2E DNN, wherein the at least one processor is further to:
direct one or more additional UEs participating in the UECS to update one or more sub-DNNs of the first set of sub-DNNs using an adjustment to the first portion of the E2E ML configuration based on the training schedule.

10. The network entity of claim 9, wherein the at least one processor is further to:
direct a first additional UE of the one or more additional UEs to update a first sub-DNN, of the first set of sub-DNNs, that generates a local wireless network communication directed to the coordinating UE; or
direct the first additional UE to update a second sub-DNN, of the first set of sub-DNNs, that receives the local wireless network communication from the coordinating UE.

11. The network entity of claim 9, wherein the adjustment to the first portion of the E2E ML configuration forms a joint processing DNN at the coordinating UE.

* * * * *